US010471591B1

(12) United States Patent
Hinkle

(10) Patent No.: US 10,471,591 B1
(45) Date of Patent: Nov. 12, 2019

(54) OBJECT HAND-OVER BETWEEN ROBOT AND ACTOR

(71) Applicant: X Development LLC, Mountain View, CA (US)

(72) Inventor: Paige Hinkle, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/995,459

(22) Filed: Jun. 1, 2018

(51) Int. Cl.
*B25J 9/16* (2006.01)

(52) U.S. Cl.
CPC ............. *B25J 9/1612* (2013.01); *B25J 9/161* (2013.01); *B25J 9/1682* (2013.01); *B25J 9/1697* (2013.01); *B25J 9/163* (2013.01)

(58) Field of Classification Search
CPC ........ B25J 9/16; B25J 11/008; B25J 11/0045; B25J 9/1669; B25J 9/1612; B25J 9/163; B25J 9/0003; G06T 7/248; G06T 7/62; G06T 7/74; G05B 2219/39536; G05B 2219/40298; G05B 2219/45108
USPC ...................................... 700/245; 318/568.12
See application file for complete search history.

(56) References Cited

U.S. PATENT DOCUMENTS

| 7,822,508 | B2 * | 10/2010 | Sugiyama | B25J 9/1612 318/568.12 |
|---|---|---|---|---|
| 7,888,900 | B2 | 2/2011 | Okamoto et al. | |
| 9,321,176 | B1 | 4/2016 | Sun et al. | |
| 9,469,028 | B2 | 10/2016 | Sisbot et al. | |
| 2005/0113977 | A1 * | 5/2005 | Nihei | B25J 9/102 700/245 |
| 2005/0165507 | A1 * | 7/2005 | Shimizu | B62D 57/032 700/245 |
| 2007/0124024 | A1 * | 5/2007 | Okamoto | B25J 5/007 700/245 |
| 2007/0239315 | A1 | 10/2007 | Sato et al. | |
| 2013/0245822 | A1 | 9/2013 | Kawanami et al. | |

OTHER PUBLICATIONS

Lasa, Physical human-robot interaction for hand-over, support, and carrying heavy objects, Published Nov. 8, 2017, Retrieved on Apr. 25, 2018, https://www.youtube.com/watch?v=cSRu14MR5mE, 4 Pages.

(Continued)

*Primary Examiner* — Dalena Tran
(74) *Attorney, Agent, or Firm* — McDonnell Boehnen Hulbert & Berghoff LLP

(57) ABSTRACT

An example robotic device may include an arm having a palm and fingers, a depth sensor disposed within the palm, and a control system. The control system may be configured to detect an indication to receive an object from an actor, and in response, cause the robotic device to enter a receive-object mode. When the robotic device is in the receive-object mode, the control system is further configured to: receive, from the depth sensor, depth data indicating a distance between the palm and the object; when the distance is greater than a first threshold and less than a second threshold, cause the arm to move towards the object; when the distance exceeds the second threshold, maintain the arm in a fixed position; and when the distance drops below the first threshold, cause the two or more fingers to close to grasp the object.

20 Claims, 21 Drawing Sheets

(56) References Cited

OTHER PUBLICATIONS

Micelli et al., Perception and Control Challenges for Effective Human-Robot Handoffs, Published Jun. 2011, RSS 2011 RGB-D Workshop, 8 Pages.
Strabala et al., Towards Seamless Human-Robot Handovers, Published 2013, Journal of Human-Robot Interaction, vol. 1, No. 1, 2013, pp. 1-23, 23 Pages.
Happich, Depth-sensing robot arm camera improves situational awareness, Published May 18, 2016, 2 Pages.
Ultra-fast, the bionic arm can catch objects on the fly (w/ Video), Published May 12, 2014, Ecole Polytechnique Federale de Lausanne, 6 Pages.
Cakmak et al. Human Preferences for Robot-Human Hand-over Configurations, 2011 IEEE/RSJ International Conference on Intelligent Robots and Systems (IROS), Sep. 2011, 8 Pages.
Huang et al., Adaptive Coordination Strategies for Human-Robot Handovers, Robotics: Science and Systems, 2015, 10 Pages.
Kupcsik et al., Learning Dynamic Robot-to-Human Object Handover from Human Feedback, Proc. International Symposium on Robotics Research 2015 16 Pages.
Kim et al., Control of a robot hand emulating human's hand-over motion (Abstract), Mechatronics, vol. 12, Issue 1, Feb. 2002, 3 Pages.
Mainprice at al., Sharing effort in planning human-robot handover tasks (Abstract), RO-MAN, 2012 IEEE, Sep. 2012, 3 Pages.
Medina et al., A Human-Inspired Controller for Fluid Human-Robot Handovers, 2016 IEEE-RAS 16th International Conference on Humanoid Robots (Humanoids), Nov. 2016, 8 Pages.

* cited by examiner

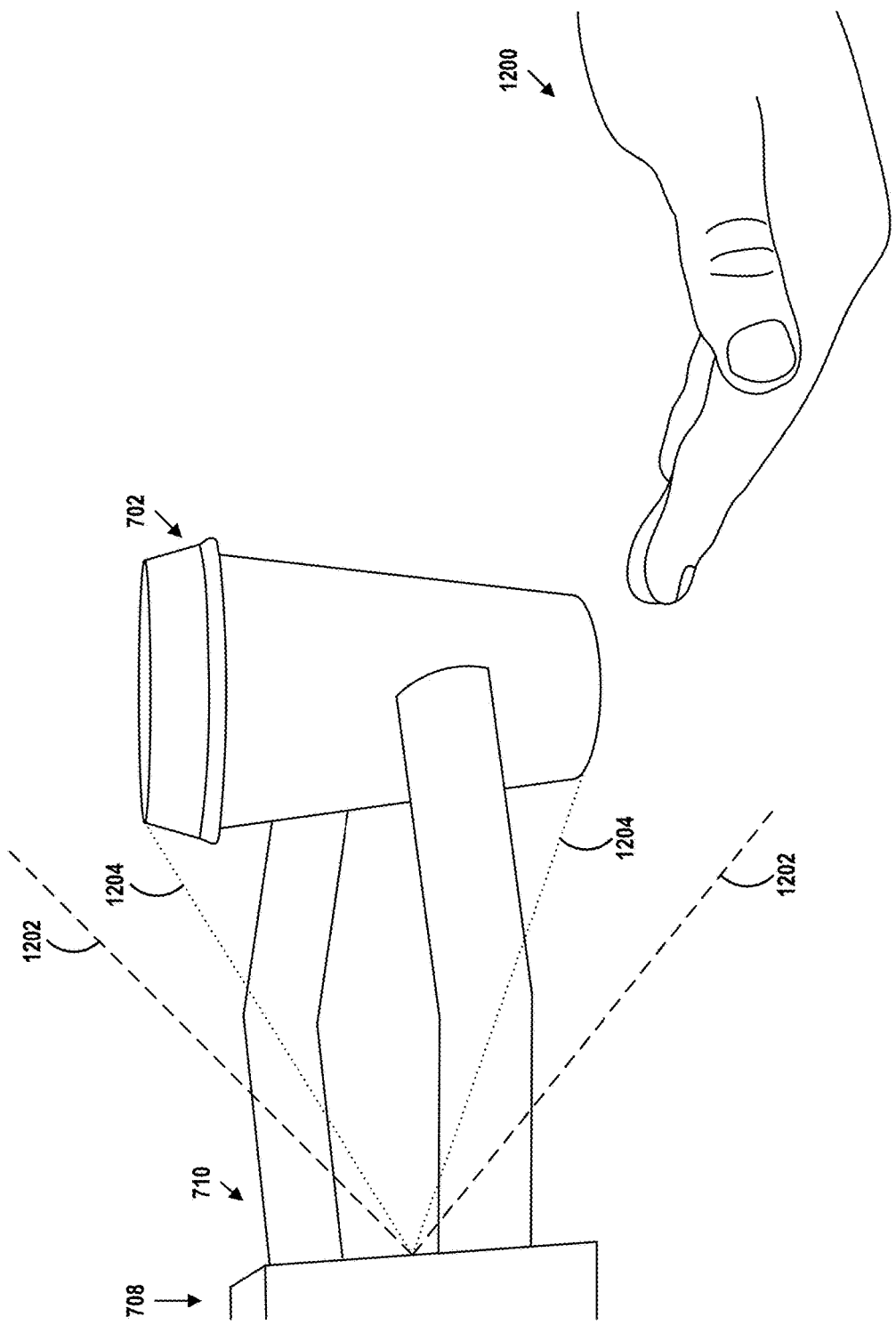

OBJECT HAND-OVER BETWEEN ROBOT AND ACTOR

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

In an example embodiment, a robotic device is configured to operate in a receive-object mode to perform a hand-over of an object from an actor to the robotic device. The receive-object mode may be triggered by the actor indicating via audible or physical cues that an object is to be handed over from the actor to the robotic device. While in the receive-object mode, the robotic device may be configured to move an arm thereof and actuate a gripper thereof based on a distance between a palm of the gripper and the object to be handed over. The distance may be measured by a depth sensor disposed within the palm.

When the distance is greater than a first threshold and smaller than a second threshold, the arm may advance the gripper towards the object. When the distance is greater than the second threshold, the arm may be maintained in a fixed position. When the distance is smaller than the first threshold, indicating that the object is between digits of the gripper, the gripper may be closed to grasp the object. In the receive-object mode, the arm may initially be moved to a predetermined position that places the object at a distance greater than the second threshold. Hand-over may thus be initiated by the actor bringing the object closer to the gripper so as to move it within the second threshold, thereby triggering the arm to advance toward the object. Similarly, hand-over may be paused by the actor moving the object back away from the gripper and outside the second threshold. Accordingly, the actor may predictably control the hand-over process by varying the distance at which the object is held.

In a first embodiment, a robotic device is provided that includes an arm having a palm and two or more fingers, a first sensor, a depth sensor disposed within the palm, and a control system. The control system is configured to receive, from the first sensor, first data associated with an actor holding an object. The control system is also configured to detect an indication to receive the object from the actor based on the first data, and in response, cause the robotic device to enter a receive-object mode. When the robotic device is in the receive-object mode, the control system is further configured to receive, from the depth sensor, depth data indicating a distance between the palm and the object. Additionally, when the robotic device is in the receive-object mode, the control system is configured to, when the distance between the palm and the object is greater than a first threshold and less than a second threshold, cause the arm to move towards the object. Further, when the robotic device is in the receive-object mode, the control system is configured to, when the distance between the palm and the object exceeds the second threshold, maintain the arm in a fixed position. Yet further, when the robotic device is in the receive-object mode, the control system is further configured to, when the distance between the palm and the object drops below the first threshold, cause the two or more fingers to close to grasp the object.

In a second embodiment, a method is provided that includes receiving, from a first sensor on a robotic device and by a control system of the robotic device, first data associated with an actor holding an object. The method also includes, based on the first data, detecting, by the control system, an indication to receive the object from the actor by an arm of the robotic device, where the arm includes a palm and two or more fingers. The method additionally includes, in response to detecting the indication to receive the object from the actor, operating the robotic device in a receive-object mode. Operating in the receive-object mode includes receiving, from a depth sensor disposed within the palm and by the control system, depth data indicating a distance between the palm and the object. Operating in the receive-object mode also includes, when the distance between the palm and the object is greater than a first threshold and less than a second threshold, causing, by the control system, the arm to move towards the object. Operating in the receive-object mode additionally includes, when the distance between the palm and the object exceeds the second threshold, causing, by the control system, the arm to be maintained in a fixed position. Operating in the receive-object mode further includes, when the distance between the palm and the object drops below the first threshold, causing, by the control system, the two or more fingers to close to grasp the object.

In a third embodiment, a non-transitory computer readable medium is provided having stored thereon instructions that, when executed by a computing device, cause the computing device to perform operations. The operation includes receiving, from a first sensor on a robotic device, first data associated with an actor holding an object. The operations also includes, based on the first data, detecting an indication to receive the object from the actor by an arm of the robotic device, where the arm includes a palm and two or more fingers. The operations additionally include, in response to detecting the indication to receive the object from the actor, operating the robotic device in a receive-object mode. Operating in the receive-object mode includes receiving, from a depth sensor disposed within the palm, depth data indicating a distance between the palm and the object. Operating in the receive-object mode also includes, when the distance between the palm and the object is greater than a first threshold and less than a second threshold, causing the arm to move towards the object. Operating in the receive-object mode additionally includes, when the distance between the palm and the object exceeds the second threshold, causing the arm to be maintained in a fixed position. Operating in the receive-object mode further includes, when the distance between the palm and the object drops below the first threshold, causing the two or more fingers to close to grasp the object.

In a fourth embodiment, a system is provided that includes means for receiving, from a first sensor on a robotic device, first data associated with an actor holding an object. The system also includes means for detecting, based on the first data, an indication to receive the object from the actor by an arm of the robotic device, where the arm includes a palm and two or more fingers. The system additionally includes means for, in response to detecting the indication to receive the object from the actor, causing the robotic device to operate in a receive-object mode. The system further includes means for receiving, when the robotic device operates in the receive-object mode and from a depth sensor disposed within the palm, depth data indicating a distance between the palm and the object. The system yet further includes means for causing the arm to move towards the object when (i) the robotic device operates in the receive-object mode and (ii) the distance between the palm and the object is greater than a first threshold and less than a second threshold. The system yet additionally includes means for causing the arm to be maintained in a fixed position when (i) the robotic device operates in the receive-object mode and (ii) the distance between the palm and the object exceeds the second threshold. The system also includes means for causing the two or more fingers to close to grasp the object when (i) the robotic device operates in the receive-object mode and (ii) the distance between the palm and the object drops below the first threshold.

In a fifth embodiment, a robotic device is provided that includes an arm having a palm and two or more fingers, a first sensor, an image sensor disposed within the palm, and a control system. The control system is configured to receive, from the first sensor, first data associated with an actor. The control system is also configured to, based on the first data, detect an indication to hand an object over from the robotic device to the actor, where the robotic device is holding the object between the two or more fingers. The control system is additionally configured to, in response to detecting the indication to hand the object over from the robotic device to the actor, cause the robotic device to enter a give-object mode. When the robotic device is in the give-object mode, the control system is configured to receive, from the image sensor, image data representing an environment around the palm. The image data includes (i) a first area containing the object held between the two or more fingers and (ii) a second area below the object. When the robotic device is in the give-object mode, the control system is also configured to, when the second area below the object is vacant, cause the arm to move towards the actor. When the robotic device is in the give-object mode, the control system is further configured to, when a hand of the actor is detected in the second area, cause (i) the arm to stop and (ii) the two or more fingers to open to release the object into the hand of the actor.

In a sixth embodiment, a method is provided that includes receiving, from a first sensor on a robotic device and by a control system of the robotic device, first data associated with an actor. The method also includes, based on the first data, detecting, by the control system, an indication to hand an object over from the robotic device to the actor, where the robotic device is holding the object between two or more fingers of an arm. The method additionally includes, in response to detecting the indication to hand the object over from the robotic device to the actor, operating the robotic device in a give-object mode. Operating in the give-object mode includes receiving, from an image sensor disposed within a palm of the arm and by the control system, image data representing an environment around the palm. The image data includes (i) a first area containing the object held between the two or more fingers and (ii) a second area below the object. Operating in the give-object mode also includes, when the second area below the object is vacant, causing, by the control system, the arm to move towards the actor. Operating in the give-object mode also includes, when a hand of the actor is detected in the second area, causing, by the control system, (i) the arm to stop and (ii) the two or more fingers to open to release the object into the hand of the actor.

In a seventh embodiment, a non-transitory computer readable storage medium is provided having stored thereon instructions that, when executed by a computing device, cause the computing device to perform operations. The operations include receiving, from a first sensor on a robotic device, first data associated with an actor. The operations also include, based on the first data, detecting an indication to hand an object over from the robotic device to the actor, where the robotic device is holding the object between two or more fingers of an arm. The operations additionally include, in response to detecting the indication to hand the object over from the robotic device to the actor, operating the robotic device in a give-object mode. Operating in the give-object mode includes receiving, from an image sensor disposed within a palm of the arm, image data representing an environment around the palm. The image data includes (i) a first area containing the object held between the two or more fingers and (ii) a second area below the object. Operating in the give-object mode also includes, when the second area below the object is vacant, causing the arm to move towards the actor. Operating in the give-object mode also includes, when a hand of the actor is detected in the second area, causing (i) the arm to stop and (ii) the two or more fingers to open to release the object into the hand of the actor.

In an eighth embodiment, a system is provided that includes means for receiving, from a first sensor on a robotic device, first data associated with an actor. The system also includes means for, based on the first data, detecting an indication to hand an object over from the robotic device to the actor, where the robotic device is holding the object between two or more fingers of an arm. The system additionally includes means for, in response to detecting the indication to hand the object over from the robotic device to the actor, operating the robotic device in a give-object mode. The system further includes means for receiving, from an image sensor disposed within a palm of the arm, image data representing an environment around the palm when the robotic device operates in the give-object mode. The image data includes (i) a first area containing the object held between the two or more fingers and (ii) a second area below the object. The system yet additionally includes means for, when the second area below the object is vacant and the robotic device operates in the give-object mode, causing the arm to move towards the actor. The system yet further includes means for, when a hand of the actor is detected in the second area and the robotic device operates in the give-object mode, causing (i) the arm to stop and (ii) the two or more fingers to open to release the object into the hand of the actor.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 12A, 12B, and 12C illustrate a robot-to-actor handover, in accordance with example embodiments.

DETAILED DESCRIPTION

Figure 1:
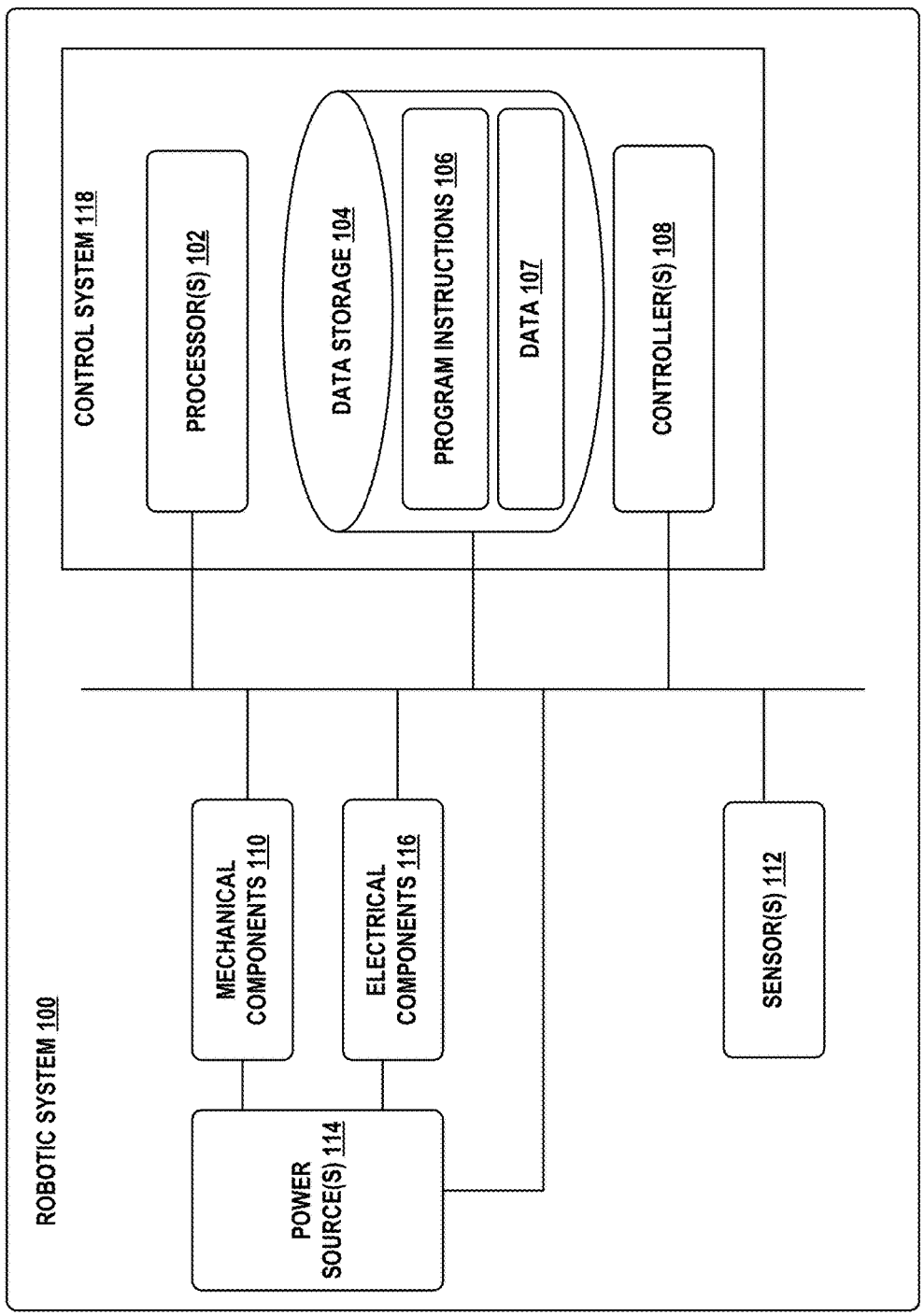
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Robots operating in a shared environment with human actors may need to hand objects to and receive objects from the human actors. The hand-over process may involve careful coordination between the robot and the human to ensure that a gripper of the robot and a hand of the actor meet in space and time to complete the hand-over. In human-to-human hand-overs, such coordination is often facilitated by physical cues that humans are adapted to exhibit and detect. However, it may be difficult to replicate the same cues with robots as not all robots have anthropomorphic structures and even those that do might not carry out such cues as accurately as humans do. Additionally, some humans may prefer to have more control over the actions of the robot than they ordinarily might have over another human during such a hand-over procedure.

Accordingly, a robot operating alongside a human actor may be configured to transition from normal operation into a receive-object mode in order to complete hand-over of an object from the actor to the robot. While in normal operation, the robot may be configured to autonomously, without explicit human input, perform various tasks within the environment. While in the receive-object mode, however, the robot may be configured to operate based on audible or physical cues from the actor, thereby allowing the actor to control coordination between the robot and the actor during object hand-over. In some cases, while in the receive-object mode, any action taken by the robot might be caused by a corresponding cue exhibited by the actor, thereby giving the actor complete control over movements of the robot and providing for a high degree of predictability of the actions of the robot while in the receive-object mode.

The receive-object mode may be triggered by an audible or physical cue generated by the actor. The robot may ask for or encourage the actor to generate the audible or physical cue by indicating that the robot is available to take an object from the actor. The robot might, for example, say "Would you like me to take that cup you are holding?" In response to this indication, the actor may utter a phrase (e.g., "Yes, please") or perform a gesture (e.g., move the cup towards the robot) to signal that the actor wishes for the robot to receive the object, thereby triggering the robot to operate in the receive-object mode. The robot might detect the actor and the object, as well as determine that the object is available for hand-over (e.g., the actor is holding the object which has a size that the robot can grasp) based on sensor data from one or more vision sensors on the robot.

Once in the receive-object mode, the robot may start to receive depth data from a depth sensor (e.g., a time-of-flight sensor) disposed within a palm of the robot's gripper. The gripper may be connected to a base or body of the robot by a robotic arm. The gripper may be opened so as not to obstruct the field of view of the depth sensor by digits of the gripper. The robot may move the robot's arm to a predetermined position or along a predetermined trajectory. Moving to the predetermined position or along the predetermined trajectory may gesture to the actor that the robot is waiting for the actor to initiate hand-over of the object. Hand-over of the object may be initiated by the actor moving the object towards the gripper or placing the object within a field of view of the depth sensor within the palm, among other possibilities.

The robot may carry out the hand-over and may be controlled by the actor based on the distance between the palm and the object. When the distance is greater than a first threshold and smaller than a second threshold, the arm may advance the gripper toward the object. When the distance is greater than the second threshold, the arm may remain in a fixed position. When the distance is smaller than the first threshold, the gripper may close around the object. The actor may thus be able to control motion of the arm by moving the object relative to the palm. Moving the object closer to the palm may cause the robot to move its arm toward the object. Moving the object away from the palm may cause the robot to stop moving the arm or, in some cases, move the arm away from the object. The robot may thus respond to each of the actor's movements of the object in a similar manner, making control of the hand-over by the actor intuitive and simple.

Notably, the robot may determine a position for the arm in which to wait for the actor to initiate the hand-over and which places the object beyond the second threshold. The actor may therefore be required to initiate the hand-over by moving the object closer to the gripper so as to place the object between the first and second thresholds. Notably, the robot might not act to take the object from the actor without the actor first initiation the hand-over. That it, the robot might not plan trajectories for moving the gripper to meet the object, but may instead rely on the actor placing and maintaining the object at an appropriate distance relative to the gripper as a way to monitor the actor's continued willingness to proceed with the hand-over during the entire process. Additionally, initiating the hand-over in this way allows the actor to get a sense of the size of the second threshold distance from the very start of the hand-over, thus informing the actor of how far away from the gripper the object will need to be moved to stop the hand-over process.

The robot may verify that the distance measured by the depth sensor is, in fact, a distance between the depth sensor and the object to be handed over, rather than another object in the environment. The verification may be performed based on a vision sensor on the robot such as, for example, a camera disposed within the palm of the gripper and having a field of view that overlaps with the field of view of the depth sensor. The verification may also be based on the depth data itself. For example, when the depth sensor generates a depth map rather than a single depth measurement, the robot may track the object within the depth map across different depth frames to ensure that the portion of the depth map used to determine the distance to the object does, in fact, correspond to the object.

Notably, because the depth sensor is disposed within the palm, it has a direct field of view to the object. Thus, the distance between the depth sensor and the object is measured directly. Contrast this with determining the distance between the object and the gripper indirectly using a sensor external to the gripper, where the distance would be measured based on (i) a distance between the external sensor and the gripper palm and (ii) a distance between the external sensor and the object. In the latter case, there are two measurements between two different objects represented within the depth data. Thus, there are two sources of potential error in the two measurements that are used to determine the distance between the object and the gripper palm, thereby potentially compounding the error.

In some implementations, the actor may have additional control over the lateral and vertical motion of the robot's arm. The lateral and vertical directions may each be orthogonal to the horizontal direction along which the arm moves to bring the gripper closer to or further away from the object. The robot may be configured to distinguish between intentional and unintentional movements of the object along each of the lateral and vertical directions. When a movement is classified as unintentional, the robot may adjust the arm to follow the object to keep it within the field of view of the depth sensor. When the movement is classified as intentional, the robot may interpret this as an indication to stop motion of the arm or retract the arm back away from the actor.

A movement may be classified as intentional when (i) a distance of the movement exceeds a threshold distance (e.g., a third threshold distance), (ii) a speed of the movement exceeds a threshold speed, or (iii) an acceleration of the movement exceeds a threshold acceleration. Otherwise, a movement may be classified as unintentional. Thus, large or rapid movements may gesture to the robot to stop advancing the arm or stop following the object, while small or slow movements may be considered part of expected variation in positioning of the object by the actor. The threshold distance, speed, and acceleration may be selectable by the actor (e.g., through a user interface of a mobile computing device communicatively connected to the robot) to tailor the robot's behavior to the actor's preferences. In some implementations, similar behavior may also be implemented with respect to movements of the object along the horizontal direction.

Additionally, in some implementations, the speed with which the robot's arm advances towards the object may be dependent on the distance between the object and the palm of the gripper. When the gripper is far away from the object, the gripper may move quickly, but may gradually slow down as it approaches the object. Further, the speed trajectory with which the gripper moves towards the object may depend on the second threshold distance, which may be modifiable based on actor preferences. For example, when the second threshold distance is large, the gripper may initially move with a high speed to quickly traverse the larger initial distance between the palm and the actor. The speed of the gripper may nevertheless decrease as the gripper approaches the object. When the second threshold distance is small, the gripper may initially move with a lower speed since it already close to the object. The speed trajectory may be configurable based on actor preferences to generate movement that is not so slow so as to annoy actors and not so fast so as to startle actors.

When the palm of the gripper moves to within the first threshold distance, the gripper may close around the object to grasp the object. The gripper may be positioned along the object to avoid contact with the actor's hand or fingers. Additionally, in some implementations, the gripper may be designed to come apart when the actor impacts the gripper with sufficient force along certain directions to thereby prevent any injury to the actor.

After the gripper is closed around the object, the arm may move the object with a small amount of force to indicate to the actor that the robot is ready to take the object. The amount of force exerted on the object by the gripper may be measured using a force-torque sensor disposed within the gripper. When the amount of exerted force drops off, indicating that the actor has released the object, the robot may proceed to move the object away from the actor. Alternatively or additionally, the robot may determine that the actor has released the object based on data from vision sensors on the robot. For example, the robot may determine that the actor has released the object when a distance between the actor's hand and the object exceeds a threshold distance (e.g., an object-release threshold distance). With the hand-over completed, the robot may cease operating in the receive-object mode, and may return to operating in autonomous mode.

The robot may also be configured to perform a handover of an object held by the robot to the actor. As with handover from the actor to the robot, the handover from the robot to the actor may be initiated via the exchange of various cues between the robot and the actor. The cues may be audible or visual and may communicate the robot's ability and willingness to give an object to the actor as well as the actor's ability and willingness to receive the object. Initiating the handover may cause the robot to operate in a give-object mode. In the give-object mode, the robot may move the arm towards the actor's hand. While moving the arm towards the actor's hand, the robot may monitor the data received from the image or depth sensor disposed within the palm of the gripper to detect the actor's hand near the gripper.

Specifically, the object, when held in the robot's gripper, may obstruct a portion of the field of view of the depth or image sensor in the palm. A portion of the field of view corresponding to an area underneath the object may, however, remain unobstructed. An area of the image or depth data corresponding to this unobstructed portion of the field of view may be monitored for the actor's hand. When the actor's hand is detected in the unobstructed portion, the robotic arm may stop and open the gripper to release the object into the actor's hand. In some cases, in order to avoid inadvertently releasing the object, the robot may open the gripper in response to the actor's hand being detected in the unobstructed area for at least a threshold period of time. In cases where the object is large, and thereby obstructs the entire field of view, the robot may rely on sensors in other parts of the robot (e.g., the head) to perform the handover from robot to actor.

By performing the handover while operating in a distinct give-object mode, the robot may avoid inadvertently dropping the object when the actor's hand or another physical feature passes under or nearby the gripper. Additionally, the distinct give-object and receive-object modes may allow the actor a greater degree of predictability of the robot's actions based on the mode in which the robot is operating.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Furthermore, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic device 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, control system 118 may perform operations to cause the robotic device 100 to move according to the requested gait. As another illustration, a control system may receive an input indicating an instruction to move to a particular geographical location. In response, control system 118 (perhaps with the assistance of other components or systems) may determine a direction, speed, or gait based on the environment through which robotic system 100 is moving en route to the geographical location.

Operations of control system 118 may be carried out by processor(s) 102. Alternatively, these operations may be carried out by controller 108, or a combination of processor(s) 102 and controller 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include physical members such as leg(s), arm(s), wheel(s), hand(s), digit(s), feet, or end effectors. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable digits, arms, hands, feet, or legs, so that these appendages can be replaced or changed as needed or desired. In some implementations, robotic system 100 may include one or more removable or replaceable battery units or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In an example configuration, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of extendable legs, arms, or other mechanical or electrical features of robotic system 100. The data provided by sensor(s) 112 may enable control system 118 to determine errors in operation as well as monitor overall operation of components of robotic system 100.

As an example, robotic system 100 may use force sensors to measure load on various components of robotic system 100. In some implementations, robotic system 100 may include one or more force sensors on an arm, leg, hand, foot, or digit to measure the load on the actuators that move one or more members of the arm, leg, hand, foot, or digit. As another example, robotic system 100 may use one or more position sensors to sense the position of the actuators of the robotic system. For instance, such position sensors may sense states of extension, retraction, positioning, or rotation of the actuators on arms, legs, hands, feet, digits, or end effectors.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Although not shown in FIG. 1, robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic device 100, such as on the body or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, robotic system 100 may include various types of legs, arms, wheels, end effectors, gripping devices and so on. In general, robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of robotic system 100 are described below.

Figure 2:
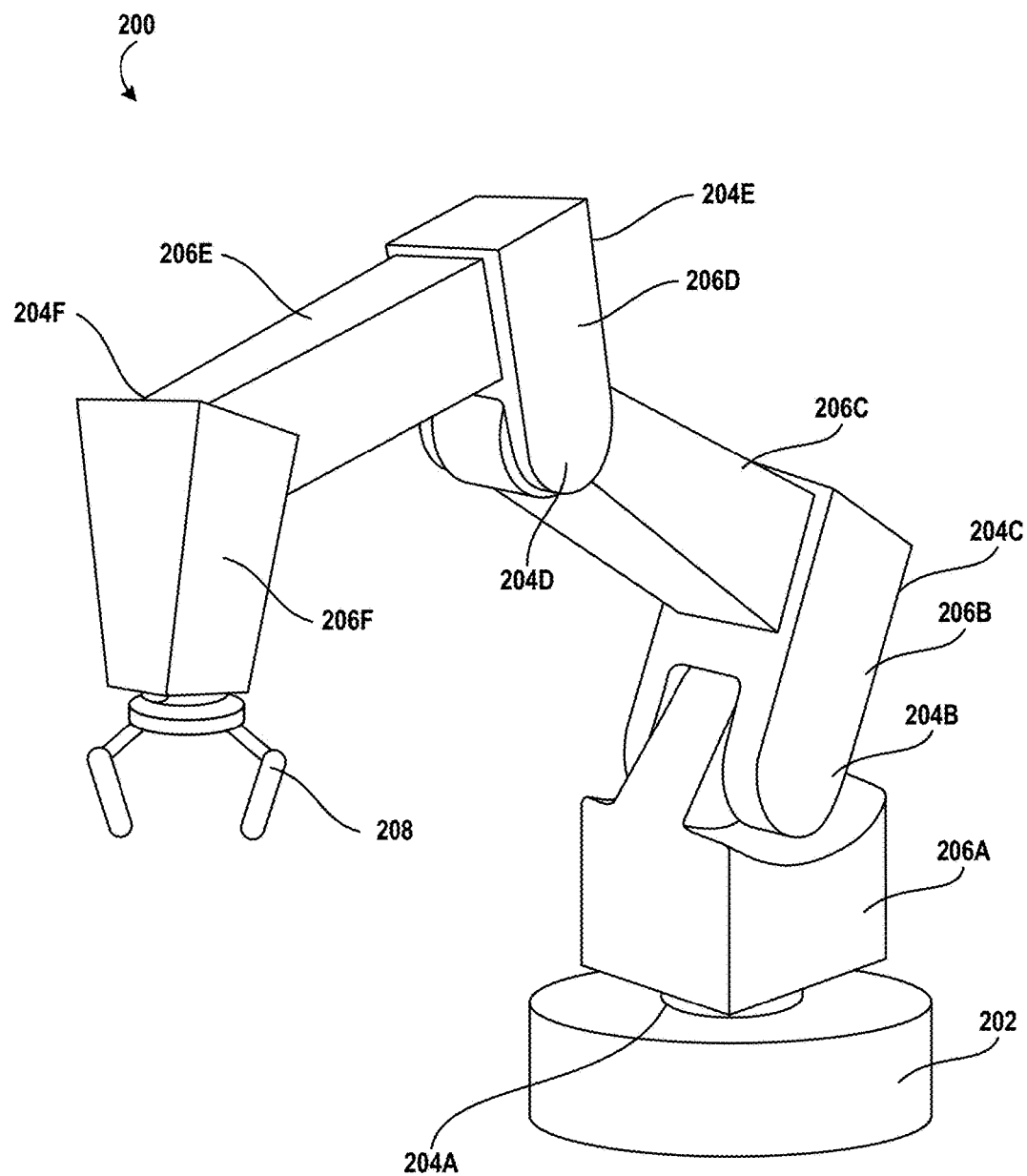
FIG. 2 illustrates a robotic arm, in accordance with example embodiments.

FIG. 2 shows an example robotic arm 200. As shown, robotic arm 200 includes a base 202, which may be a stationary base or may be a movable base. In the case of a movable base, the base 202 may be considered as one of mechanical components 110 and may include wheels (not shown), powered by one or more of actuators, which allow for mobility of the entire robotic arm 200.

Additionally, robotic arm 200 includes joints 204A-204F each coupled to one or more actuators. The actuators in joints 204A-204F may operate to cause movement of various mechanical components 110 such as appendages 206A-206F or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a digit gripper as shown here or a different type of gripper such as a suction gripper. In another example, end effector 208 may take the form of a tool such as a drill or a brush. In yet another example, the end effector may include sensors such as force sensors, location sensors, or proximity sensors. Other examples may also be possible.

In an example implementation, a robotic system 100, such as robotic arm 200, may be capable of operating in a teach mode. In particular, teach mode may be an operating mode of robotic arm 200 that allows a user to physically interact with and guide robotic arm 200 towards carrying out and recording various movements. In a teaching mode, an external force is applied (e.g., by the user) to robotic system 100 based on a teaching input that is intended to teach the robotic system regarding how to carry out a specific task. Robotic arm 200 may thus obtain data regarding how to carry out the specific task based on instructions and guidance from the user. Such data may relate to a plurality of configurations of mechanical components 110, joint position data, velocity data, acceleration data, torque data, force data, and power data, among other possibilities.

For example, during teach mode the user may grasp onto any part of robotic arm 200 and provide an external force by physically moving robotic arm 200. In particular, the user may guide robotic arm 200 towards grasping onto an object and then moving the object from a first location to a second location. As the user guides robotic arm 200 during teach mode, the system may obtain and record data related to the movement such that robotic arm 200 may be configured to independently carry out the task at a future time during independent operation (e.g., when robotic arm 200 operates independently outside of teach mode). Note, however, that external forces may also be applied by other entities in the physical workspace such as by other objects, machines, or robotic systems, among other possibilities.

Figure 3:
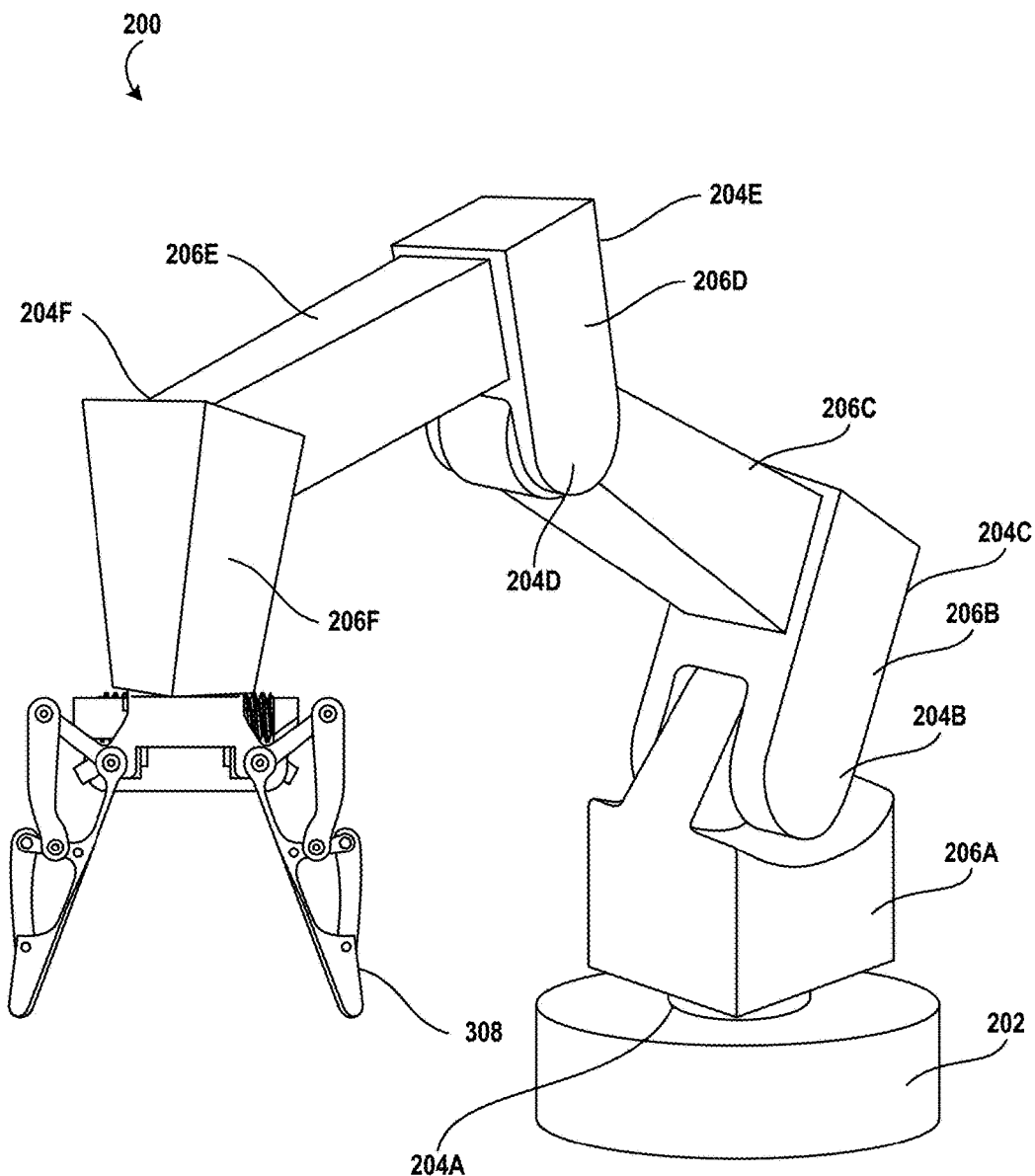
FIG. 3 illustrates a robotic arm having an underactuated robotic gripper, in accordance with example embodiments.

FIG. 3 shows the example robotic arm 200 with an underactuated robotic gripping device 308. Robotic gripping device 308 may be similar or identical to any of the underactuated robotic gripping devices described in more detail below.

III. Example Underactuated Robotic Gripping Device

Figure 4:
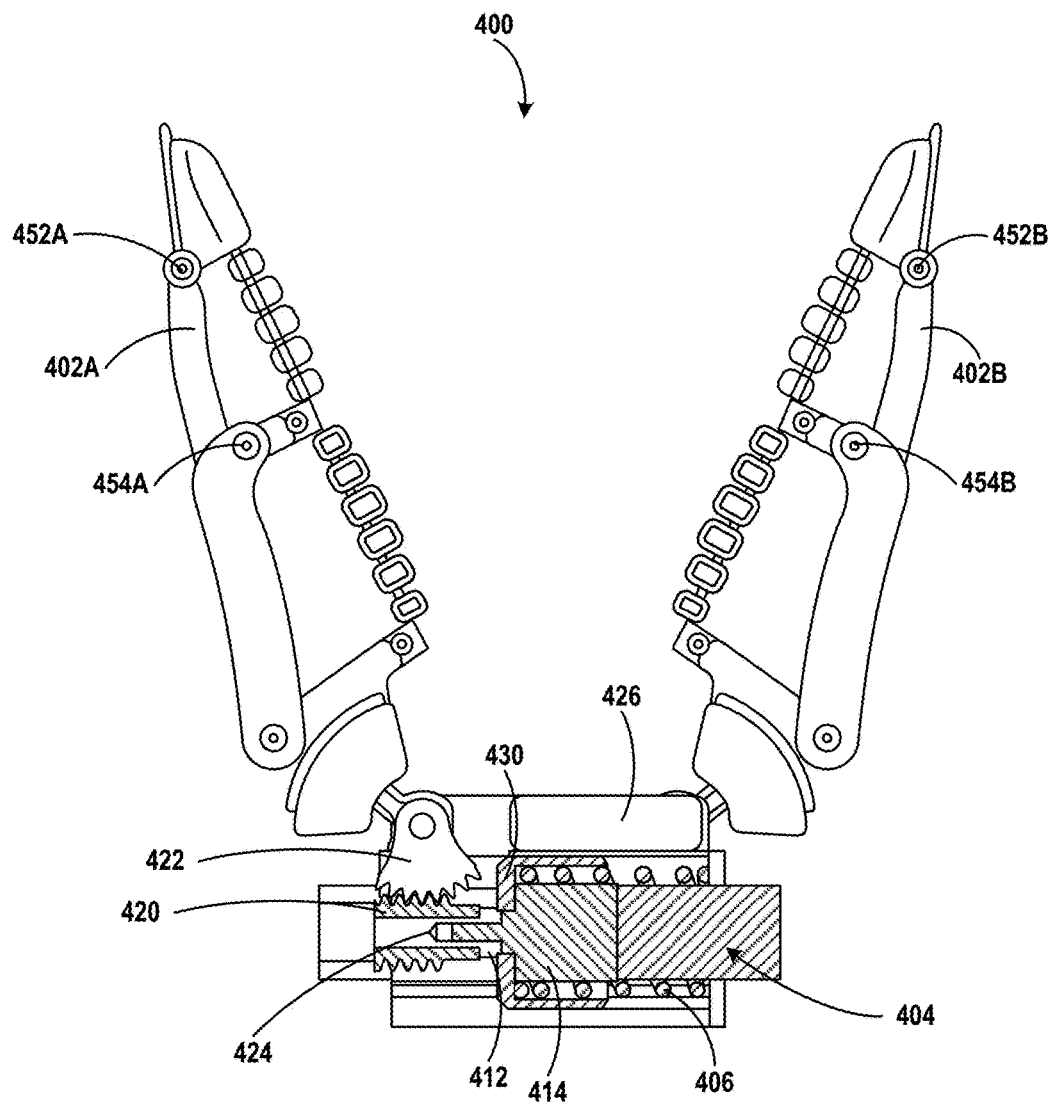
FIG. 4 illustrates an underactuated robotic gripper, in accordance with example embodiments.

FIG. 4 illustrates an example underactuated robotic gripping device. Robotic gripping device 400 may be implemented as a mechanical component of system 100 or robotic arm 200. Although the components illustrated in FIG. 4 are shown with a certain orientation or design, it should be understood that one or more components of robotic gripping device 400 may be removed, added, or modified while remaining within the scope of this disclosure. Also, the orientation and combination of components may be changed based on the desired implementation.

Robotic gripping device 400 may include one or more physical components, including one or more digits 402A-B, actuators 404, or springs 406. In some examples, robotic gripping device 400 may include two opposable digits, as shown in FIG. 4. In other examples, more or fewer digits may be included. Where three or more digits are included, the digits may be arranged in two groups opposing each other, such that when they are actuated they close toward each other. Two digits may be positioned opposite the third, such that when the digits close they interlock. In other examples, the digits may be positioned or spaced evenly around a palm or base section. Other arrangements are possible as well.

Each digit 402A-B may be configured to move in a gripping direction, to contact, grasp, hold, grip, or otherwise interact with an object. In this disclosure, movement of the digit(s) may refer to rotation about one or more axes. For example, the base of each digit may be rotatably coupled along a respective axis to one or more other components of the robotic gripping device, and movement of each digit may include rotation of the digits about the respective axes. In some example the axis of rotation of a digit may be the axis about which a worm gear coupled to the digit rotates.

In other examples, movement of the digits may include translational movement along an axis, such as movement in a clamping or sliding manner. The digits may be coupled to one or more components of the robotic gripping device in a manner that allows them to maintain their orientation with respect to the gripping device (i.e., without rotating). For instance, a digit may move in a manner similar to how the components of a vice move, such that the plane created by the gripping surface of a digit remains fixed relative to the gripping device while movement of the digits occurs. Or, the movement may be a combination of rotation and translation. Other types of movement are contemplated, with the above examples being included for description and to aid in understanding of the concepts involved herein.

The gripping surface of the digits may be flexible or deformable, and may be a flexible plastic, rubber, or other material suitable for gripping an object. As a result, movement of a digit may include deformation of the gripping surface or structure of the digit. For example, the digit may deform, bend, curve, distort, warp, stretch, or otherwise alter its shape based on one or more factors, such as an impacting force or pressure. In an example embodiment, a two digit robotic gripping device such as the one shown in FIG. 4 may include an object placed at the midpoint of the digits. When the digits close on the object, the object may cause the tips of the digits to bend or curl around the object. As described herein, movement of the digits may include this deformation of the digits.

In some examples, the digits may be underactuated. Underactuated digits do not include an actuator for each joint of the digit, but instead have fewer actuators and cannot control each joint independently. One benefit of underactuated digits is that they can require less complex control systems and can be simpler to manufacture than fully actuated digits. In reference to FIG. 4, joints 452A-B and 454A-B may be underactuated joints that might not be independently actuated by separate actuators.

In some examples, a deformable gripping surface of an underactuated digit may be a single or unitary component. In other examples, a deformable gripping surface may include a plurality of members coupled together end-to-end to create an elongated gripping surface. The plurality of members may be rotatably coupled together by unactuated joints, such as pin joints, rolling joints, or circular joints, for example. Further, a deformable gripping surface may be configured to be generally straight under normal circumstances, such as when no pressure or force is applied to the surface and the digit is in a normal operating state. In other examples, a deformable gripping surface may be configured to have a bend or curve under normal circumstances (i.e., a biased shape), such that when no pressure or force is applied to the gripping surface it is curved or bent nonetheless.

In some examples, a deformable gripping surface may run or span the entire length of the digit between the digit tip and the base of the digit. In other examples, a deformable gripping surface may be included on only a portion of an inner surface of the digit, such that only a portion of the digit includes the deformable gripping surface.

For purposes of explanation, the components of FIG. 4 will be described with respect to a single digit. However, multiple digits, actuators, springs, and gears may be included in a robotic gripping device in accordance with examples described herein.

In FIG. 4, digit 402A may be coupled to a worm gear 422. In some examples, worm gear 422 may be connected directly to a bottom end of digit 402A. In other examples, worm gear 422 may be coupled to digit 402A through one or more other gears or components, and may be coupled to a section of the digit other than the bottom end. As used herein, a first component "coupled" to a second component means that the two components may be directly connected to each other, or may have one or more components, gears, shafts, or connecting elements placed between them. As shown in FIG. 4, worm gear 422 is directly connected to digit 402A.

Worm gear 422 may be a circular worm gear or worm wheel, having teeth facing outward surrounding an inner wheel. In some examples, the shape of worm gear 422 may be a partial circle, such as the worm gear shown in FIG. 4. Further, the shape of worm gear 422 may be either symmetric or asymmetric, full or partial, and may be a circle or any other shape. Worm gear 422 may be coupled to digit 402A such that rotation of worm gear 422 causes digit 402A to move or rotate. And further, worm gear 422 may be coupled such that rotation or movement of digit 402A causes the worm gear to rotate (i.e., worm gear 422 and digit 402A can drive each other). In some examples, the teeth of worm gear 422 may be curved or angled to provide a smoother coupling to worm 420. This may result in smoother operation of the robotic gripping device.

Robotic gripping device 400 may also include an actuator 404. Actuator 404 may include a motor 414 and a shaft 412. When the actuator is turned on, engaged, or otherwise activated, motor 414 may rotate shaft 412 in a clockwise or counterclockwise direction. Shaft 412 may be coupled to worm 420, and may be configured to cause worm 420 to rotate. Worm 420 may be a cylindrical gear, with teeth similar to the threads on a screw or bolt. Worm 420 may also be called a 'worm screw.' Worm 420 may be coupled to worm gear 422 such that the axis of rotation of worm 420 is perpendicular to the axis of rotation of worm gear 422.

Worm 420 and worm gear 422 may have a high reduction ratio. Where there is a high reduction ratio, one full rotation of worm 420 may correspond to 1/32 of a full rotation (or some other small amount) of worm gear 422. The reduction ratio may depend on the number and spacing of the teeth of worm gear 422 and worm 420. A characteristic of the high reduction ratio is that the worm is not back-drivable. As such, a force rotating worm 420 may cause worm gear 422 to responsively rotate, but a force rotating the worm gear 422 might not cause the worm 420 to responsively rotate.

In some examples, actuator 404 may be mounted on a carriage 430 such that the actuator 404 and carriage 430 are configured to slide together along an axis. One or more components of actuator 404 may be glued, screwed, or otherwise affixed to carriage 430. Carriage 430 in turn may be coupled to a base section via a sliding coupling or other low friction coupling. As such, carriage 430 may be free to slide along one axis. Carriage 430 may be any component that allows actuator 404 to slide along the axis. As such, carriage 430 may be any shape or dimension that couples to actuator 404 to allow the actuator to slide along the axis, and may be a plastic, metal, composite, or other material.

Robotic gripping device 400 may also include a spring 406. Spring 406 may have two ends, with a first end coupled to actuator 404 and a second end fixed. In FIG. 4, the second end of spring 406 is fixed to the base of robotic gripping device 400. Spring 406 may be fixed to another component of robotic gripping device 400 as well. In some example, spring 406 may be configured such that the first end moves when carriage 430 and actuator 404 slide. When actuator 404 and carriage 430 are in a first position, spring 406 may be at equilibrium. Equilibrium means that the forces acting on the spring are balanced, such that an added force is required to compress or expand the spring. Then when actuator 404 slides to a second position (due to one or more forces or torques acting on the robotic gripping device), spring 406 may be compressed or expanded such that spring 406 is no longer at equilibrium. In this state, spring 406 may impart a responsive force on actuator 404 in an attempt to return to the first position at which the spring is at equilibrium.

In some examples, the spring may surround the actuator, such as spring 406 shown in FIG. 4. More or less of actuator 404 may be surrounded by spring 406 than shown in FIG. 4. Arranging spring 406 around actuator 404 results in a more compact design, allowing a robotic gripping device to be smaller and thus appropriate for more uses and applications. In other examples, two or more springs may be used, and the spring(s) may be positioned to the side or otherwise not surrounding the actuator.

Spring 406 may have one or more characteristics, such as size, firmness, spring constant, or material. Each of these characteristics may be altered based on the particular application of the robotic gripping device. For example, a spring with a higher spring constant may require more force to compress or expand, which may be used to determine the appropriate spring to use for a particular application.

In some examples, the robotic gripping device may also include one or more encoders, sensors, or detectors configured to detect the rotation, position, movement, or forces acting on one or more parts of the robotic gripping device. For example, robotic gripping device 400 may include actuator encoder 424, which may be positioned on or coupled to the base of robotic gripping device 400. Actuator encoder 424 may be configured to detect the rotation of shaft 412, and may provide information about the extent or amount of rotation to a control system. Actuator encoder 424 may also be positioned on the shaft 412, or may be positioned on one or more other components of robotic gripping device 400. In some examples, actuator encoder 424 may detect the rotation of the actuator with respect to motor 414, the base of the robotic gripping device, or one or more other components. As such, both relative and absolute amounts of rotation of shaft 412 may be detected. Further, robotic gripping device 400 may include one or more digit encoders configured to detect the rotation or movement of one or more digits.

Actuator encoder 424 or the one or more digit encoders may be rotary encoders. In some cases, the encoders may be mechanical, optical, magnetic, capacitive, or another type of encoder. In addition, the encoders may be absolute or may be incremental.

In some examples, robotic gripping device 400 may include one or more linear encoders or potentiometers 426. Potentiometer 426 may be configured to detect a position of carriage 430 relative to the base of the robotic gripping device, and provide an output that may be received by a control system. The potentiometer may also detect a relative movement of carriage 430. In some examples, potentiometer may detect the position of carriage 430 in a first position in which spring 406 is at equilibrium, and detect the position of carriage 430 when the spring is compressed or expanded. The potentiometer may determine the difference between the first and second position and provide this information to the control system. Various types of linear encoders may be used, such as optical, magnetic, capacitive, or inductive encoders.

Robotic gripping device 400 may also include a control system such as control system 118 in FIG. 1, which may control one or more aspects of robotic gripping device 400. The control system may include one or more processors, and may also include a non-transitory computer-readable memory, which may have stored thereon instructions executable by the one or more processors to carry out one or more actions described herein.

In some examples, the control system may determine an amount of torque acting on digit 402A by receiving information from potentiometer 426. The information provided by potentiometer 426 may include a distance the actuator has translated between a first position (equilibrium) and a second position (non-equilibrium). The control system may then determine the amount of torque based on the difference between the first and second positions and a characteristic of the spring, such as a spring constant. In some examples, the control system may also be configured to identify an object for the robotic gripping device to grasp, and activate one or more actuators to move one or more digits of the robotic gripping device in order to attempt to grasp the object.

IV. Example Sensorized Grippers

Figure 5:
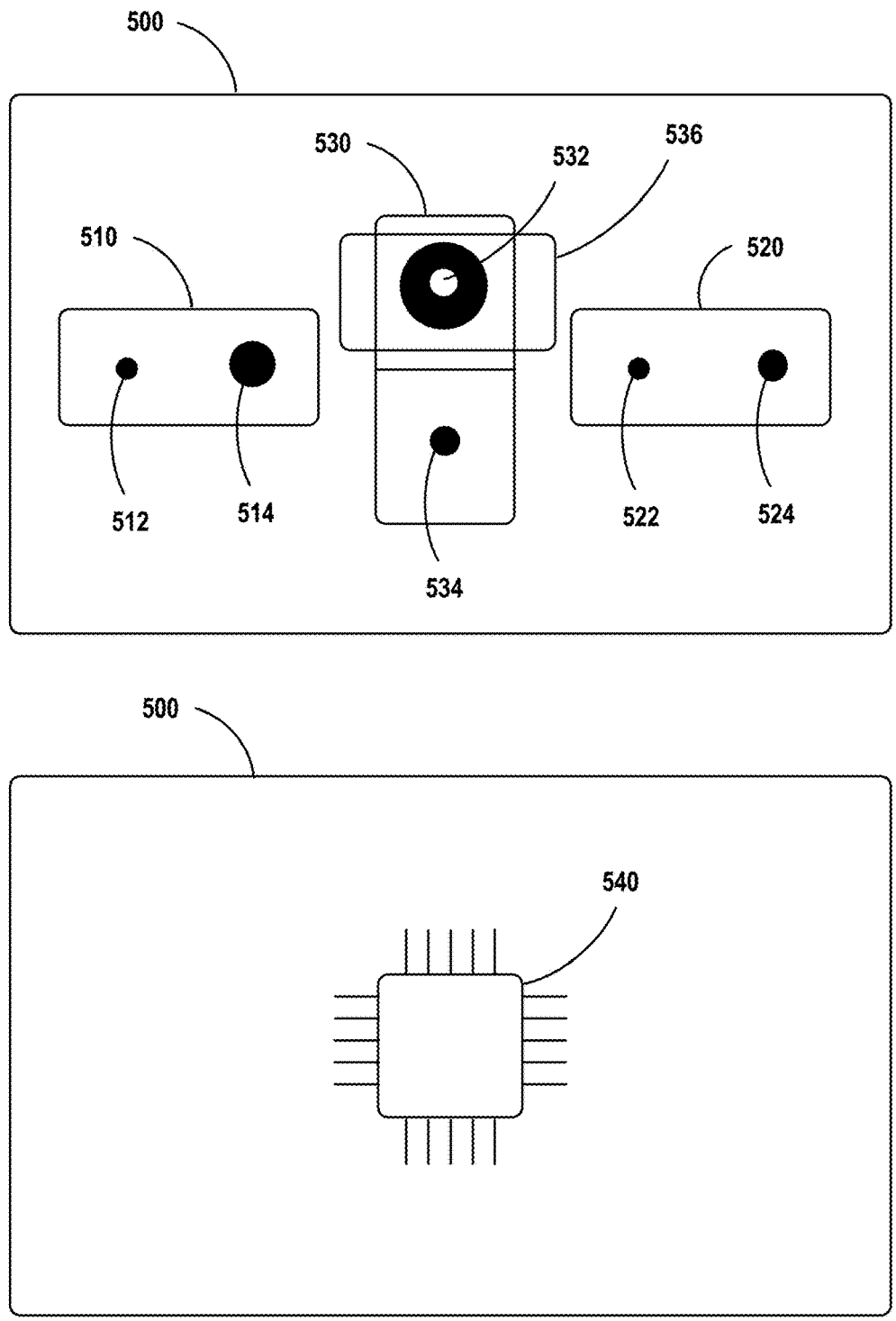
FIG. 5 illustrates a sensing device for a robotic gripper, in accordance with example embodiments.

FIG. 5 illustrates a sensing device for a robotic gripper, in accordance with example embodiments. More specifically, printed circuit board (PCB) 500 may be configured to fit into the palm of a robotic gripper, such as an underactuated gripper described in reference to FIG. 4. PCB 500 may include sensors including a short-range time-of-flight sensor 510, a long-range time-of-flight sensor 520, and an infrared microcamera 530 arranged on a front side of PCB 500. PCB 500 may additionally include an IMU 540 arranged on a rear side of PCB 500.

Short-range time-of-flight sensor 510 may include a narrow light source 512 and a light detector 514 to measure how long it takes laser light projected by light source 512 to bounce back after hitting an object. This time may be used to accurately determine a range or distance to a nearest object from short-range time-of-flight sensor 510 based on the known speed of light. As an example, short-range time-of-flight sensor 510 may have a range of about 1 centimeter up to 20 centimeters from the palm of the gripper. Additionally, short-range time-of-flight sensor 510 may have a relatively narrow field of view (e.g., 40 degrees) in order to detect objects within a cone of sensing range extending out from light detector 514. Based on its range, short-range time-of-flight sensor 510 may be most effective for determining information about grasped objects.

In addition to a time-of-flight distance measurement, short-range time-of-flight sensor 510 may additionally be configured to produce a reflectance measurement indicative of total activity returned to light detector 514. More specifically, a return signal rate may be generated based on the return signal count during the convergence time for the range measurement. This reflectance value or intensity value may be measured in a unit of mega-counts per second (mcps).

Long-range time-of-flight sensor 520 may also include a light source 522 and a light detector 524. However, long-range time-of-flight sensor 520 may be configured to detect objects further away from the palm of the gripper than short-range time-of-flight sensor 510. For instance, long-range time-of-flight sensor 520 may be configured to detect objects within a range of 3 centimeters up to 200 centimeters from the palm of the gripper. Long-range time-of-flight sensor 520 may also have a narrower field of view than short-range time-of-flight sensor 510. For instance, long-range time-of-flight sensor 520 may have a field of view of 25 degrees. Long-range time-of-flight sensor 520 may therefore detect a narrower cone of space in the area between gripper digits than short-range time-of-flight sensor 510. Like short-range time-of-flight sensor 510, long-range time-of-flight sensor 520 may also be configured to generate a reflectance measurement in addition to a distance measurement. Based on its range, long-range time-of-flight sensor 520 may be most effective for detecting objects to approach with the gripper.

Infrared microcamera 530 may include an infrared illumination source 532 configured to illuminate an area in front of the palm of the gripper with infrared radiation. Infrared microcamera 530 may additionally include an infrared sensitive receiver 534 for detecting at least a portion of the illuminated area. External illumination improves the performance of infrared camera 530. By relying on external illumination, camera 530 can detect objects in low-light areas or even in total darkness. Camera 530 may provide relatively high-rate, low-resolution grayscale images. A grayscale image is one in which each pixel represents only an amount or intensity of light (in this case, infrared light, or a combination of visible light and infrared light). As a specific example, camera 530 may generate 60×60 grayscale images with a range of about 60 centimeters from the palm of the gripper. In some examples, camera 530 may be configured to detect objects within a range that extends past the range of the short-range time-of-flight sensor, but does not extend as far as the range of the long-range time-of-flight sensor. Accordingly, camera 530 may be most effective for detecting objects near the tips of the digits of the gripper.

In some examples, a sensing device may additionally include an external infrared diffuser 536 to improve the performance of infrared camera 530. Infrared cameras are generally susceptible to "hot spots," overexposed sections of the image corresponding to regions where intensity from artificial infrared illuminators is greatest. More specifically, infrared camera 530 may include an integrated illuminator 532 with a narrow beam which saturates central features that reflect infrared light back into camera 530. If the infrared camera is of a type designed for gesture recognition, the camera may be configured to underexpose regions that are not overexposed, which could exacerbate the problem. Although the imager's intrinsic dynamic range may cover, e.g., a 9-bit measurement span for intensity, the returned product may be significantly degraded as content is pushed to an extreme pixel value. This effect may reduce extractable information and prevent robust feature identification.

Hot spot artifacts created by irregular reflections may cause a "headlight in fog" condition where illumination only works to blind the imager's ability to capture the scene. Irregular reflections may be produced by even regular objects when not aligned. This may undermine robot control functionality that depends on the image data, such as the ability to detect objects in hand or to visually servo based on detected edges.

To address this potential problem, an infrared diffuser 536 may be placed over illumination source 532 or the entire infrared camera 530. Diffuser 536 may be configured to diffuse (e.g., soften or spread out) concentrated infrared light from infrared illumination source 532. Diffuser 536 may have various shapes and sizes, and may be made of various materials. In some examples, diffuser 536 may be a rectangular semi-transparent plastic component external to infrared camera 530. In other examples, diffuser 536 may be integrated inside infrared camera 530 instead. In further examples, diffuser 536 may include multiple layers, possibly with each layer being made of a different material. Infrared diffuser 536 may significantly improve performance of infrared camera 530 in detecting edges and resolving other features in an area extending out from the palm of a robot gripper.

As shown in FIG. 5, infrared camera 530 may be arranged between short-range time-of-flight sensor 510 and long-range time-of-flight sensor 520 on PCB 500. By spacing out the time-of-flight sensors in this manner, additional angular information may be obtained about the region between the digits of the gripper. In further examples, the time-of-flight sensors 510, 520 and infrared camera 530 may be positioned in different arrangements on PCB 500.

In other examples, different numbers or types of non-contact sensors may be used instead of those illustrated in FIG. 5. In particular, only a single time-of-flight sensor capable of generating both accurate short-range and long-range distance data may be used instead of multiple time-of-flight sensors. Additionally, a different type of microcamera such as an RGB camera or an ultraviolet camera may be used instead of or in addition to an infrared camera in some embodiments. Other sensors could also be integrated into the system, including for example an RGB color sensor.

IMU 540 positioned on the back of PCB 500 may be relatively easy to integrate into the hardware and therefore may be nearly free in terms of offering additional information about the gripper. In particular, IMU 540 may be configured to detect vibration on contact, particularly to confirm that an object is being touched by the gripper or for slip detection. In other examples, IMU 540 might not be included on PCB 500.

Figure 6:
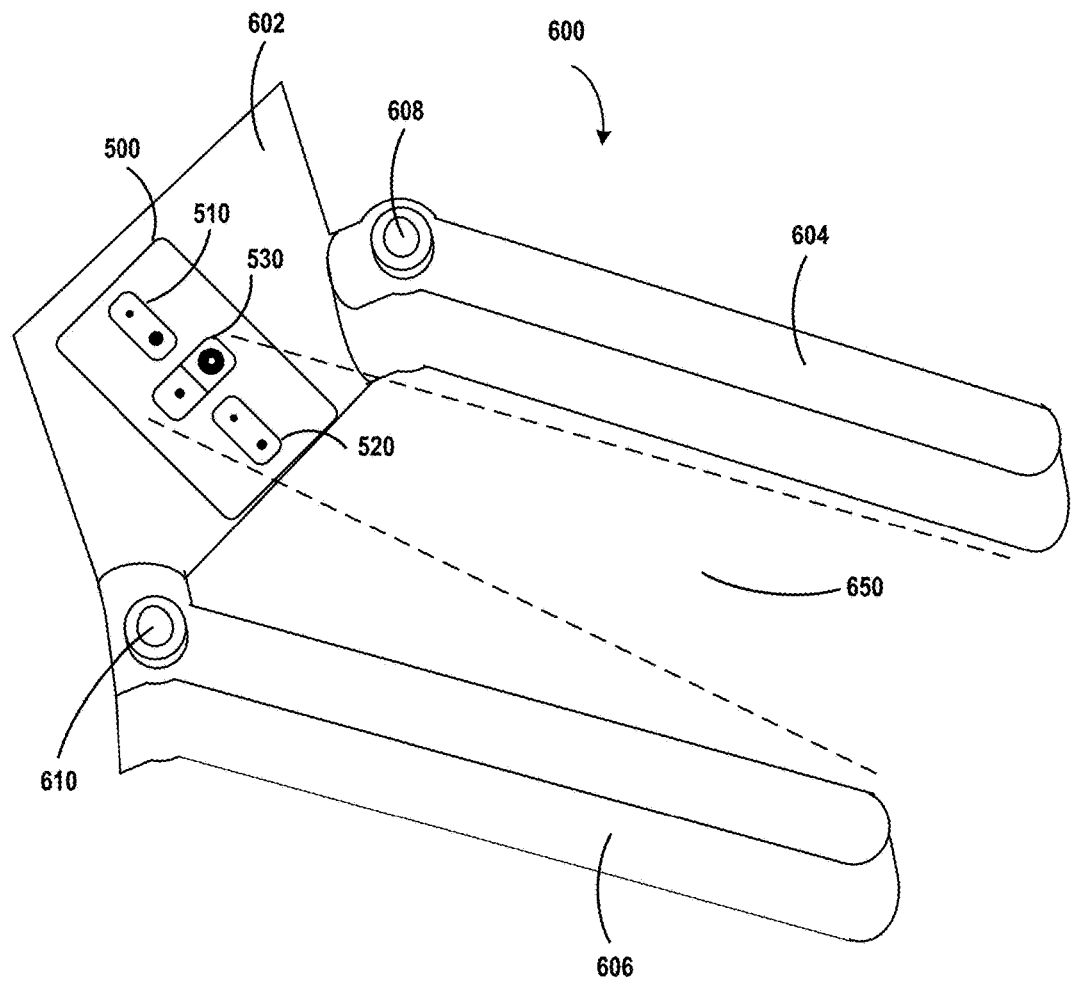
FIG. 6 illustrates a robotic gripper with a sensing device on the palm, in accordance with example embodiments.

FIG. 6 illustrates a robotic gripper with a sensing device on the palm, in accordance with example embodiments.

More specifically, a robotic gripper 600 includes PCB 500 from FIG. 5 affixed to a palm 602 of robotic gripper 600. Robotic gripper 600 additionally includes opposable digits 604, 606. Digits 604 and 606 may be configured to rotate towards and away from each other using respective rotational joints 608 and 610. Such a motion may be initiated by a control system of a robot to cause digits 604 and 606 to grasp an object within a region 650 between digits 604 and 606. Further example embodiments include more than two digits (e.g., three, four, or five digits) or only a single digit (e.g., a hook gripper)

The non-contact sensors on PCB 500, including short-range time-of-flight sensor 510, long-range time-of-flight sensor 520, and infrared camera 530, may therefore be oriented on palm 602 in order to generate sensor data in a direction between digits 604 and 606. The sensor data may be indicative of objects within region 650, including objects near palm 602 and near the tips of digits 604 and 606. The sensor data may also be indicative of objects that are beyond the tips of digits 604 and 606. Each non-contact sensor on PCB 500 may generate sensor data for a different specific region in the general direction between digits 604 and 606.

As shown in FIG. 6, PCB 500 may be arranged on palm 602 so that short-range time-of-flight sensor 510, long-range time-of-flight sensor 520, and infrared camera 530 are aligned vertically. In other embodiments, PCB 500 may be arranged on palm 602 so that short-range time-of-flight sensor 510, long-range time-of-flight sensor 520, and infrared camera 530 are aligned horizontally, or in a different manner.

In some examples, PCB 500 may interface with a sensor board that services a force-torque sensor on a wrist that is coupled to palm 602 of the gripper 600. The wrist may be configured to move palm 602 or gripper 600 in one or more degrees of freedom. As an example, the force-torque sensor may be configured to measure forces and torques on the wrist in six degrees of freedom. Data from the force-torque sensor may be used to learn information about grasp quality or information about an object being grasped. In some examples, data from the force-torque sensor may be fused with data from one or more non-contact sensors on the gripper.

Although not shown in FIG. 6, in some embodiments, digits 604 and 606 may be underactuated digits such as described in reference to FIG. 4. Additionally, data from one or more encoders may be used to determine torque, velocity, or position information about the digits 604 and 606, such as described in reference to FIG. 4. Such data may be fused with data from other sensors as well, including non-contact sensors. In further examples, additional camera data from a head-mounted camera may be used as well.

V. Example Actor and Object Detection

Figure 7:
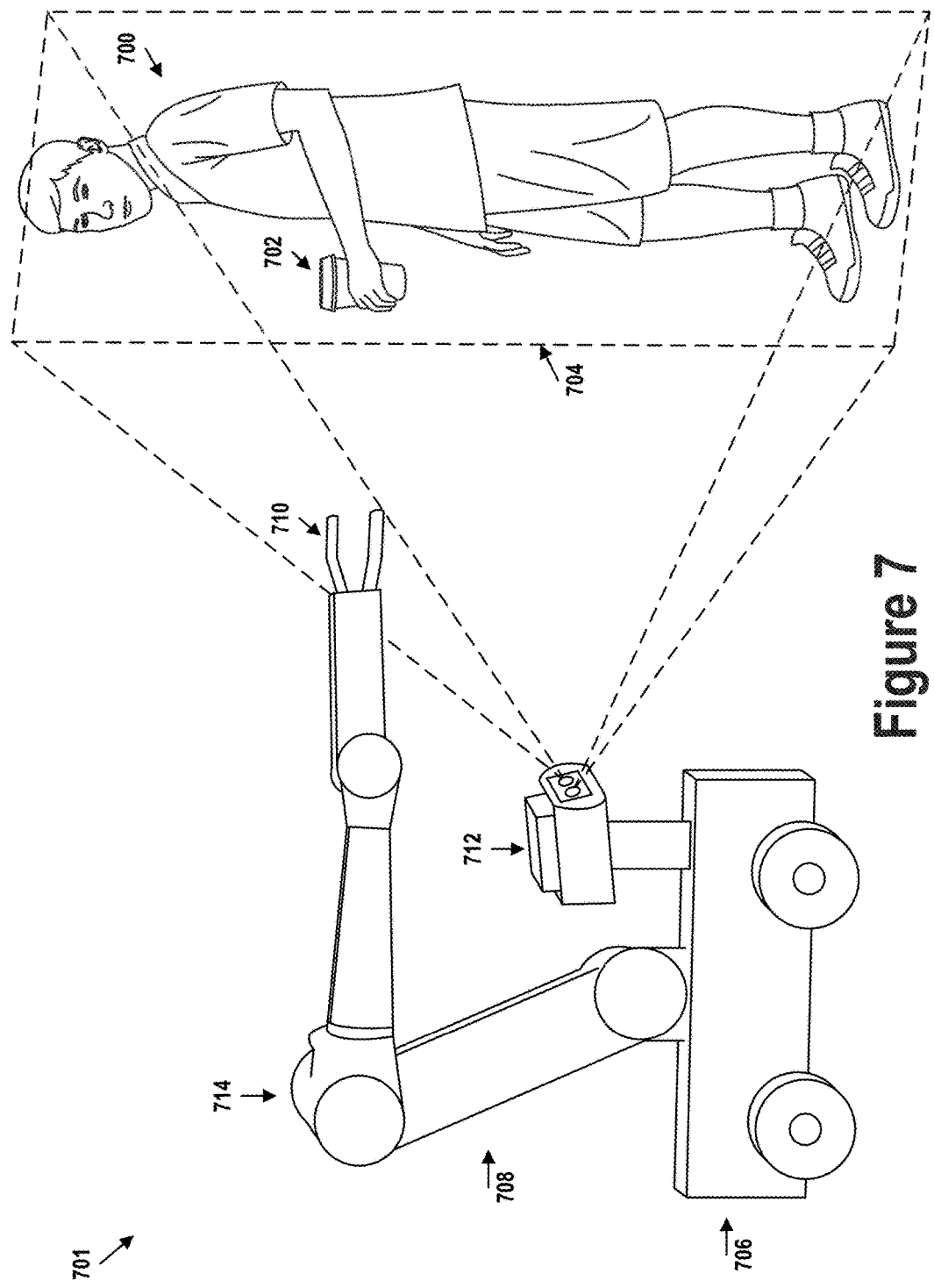
FIG. 7 illustrates a robotic device detecting an actor, in accordance with example embodiments.

FIG. 7 illustrates a robotic device detecting an actor to determine whether to initiate hand-over of an object held by the actor. Robotic device 701 may include mobile base 706, robotic arm 708, gripper 710, and robotic head 712. Robotic device 701 may operate in a shared environment alongside actor 700, which may be holding object 702 (i.e., a cup). Mobile base 706 may be configured to move robotic device 701 through the environment by way of wheels or tracks, for example. In some implementations, robotic device 701 may be connected to a base that has a fixed position in the environment.

Robotic arm 708, illustrated in pose (i.e., position and orientation) 714, may be configured to move with multiple degrees of freedom to reposition gripper 710 relative to mobile base 706. Robotic arm 708 may, for example, represent or include aspects of robotic arm 200. Similarly, gripper 710 may represent or include aspects of end effector 208, gripping device 308, gripping device 400, or gripper 600. Notably, gripper 710 may include a palm (e.g. palm 602), two or more fingers (e.g., digits 606 and 604), and a depth sensor disposed in the palm (e.g., short-range time-of-flight sensor 510, long-range time-of-flight sensor 520, or a combination thereof). In some implementations, gripper 710 may also include in the palm thereof a camera (e.g., camera 530). In some implementations, gripper 710 may be another type of end effector capable of receiving an object such as, for example, a suction gripper, a magnetic gripper, or an adhesive gripper which might not include any fingers or digits.

Robotic head 712 may include therein one or more vision sensors such as a red-green-blue camera, an infrared camera, or a stereo camera, among other possibilities. In some implementation, the visions sensor may also include a pattern projector (e.g., infrared) to assist with determination of the depth of various features within the environment. Robotic device 701 may be configured to use the vision sensor in robotic head 712 to scan the environment surrounding robotic device 701 to identify tasks for robotic device 701 to complete. To that end, robotic device 701 may use the vision sensors in robotic head 712 to detect actor 700, as indicated by field of view 704. Actor 700 may be holding cup 702, which robotic device 701 may be capable of receiving from actor 700 and putting away to an appropriate location. To complete such an operation, robotic device 701 may be configured to analyze the sensor data received from the vision sensor on robotic head 712 to determine whether an object is available for hand-over to robotic device 701.

Figure 8:
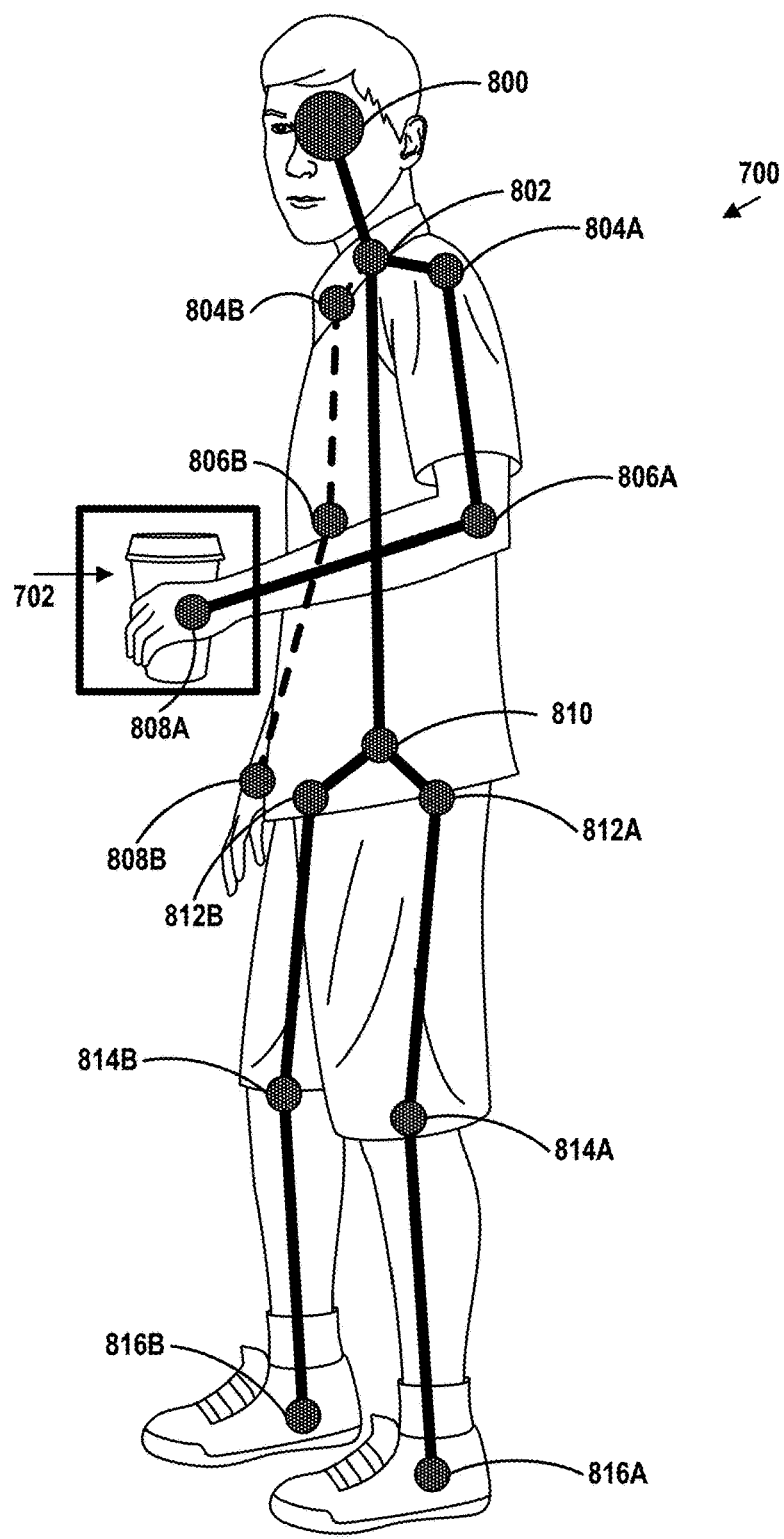
FIG. 8 illustrates a virtual skeleton fitted to an actor, in accordance with example embodiments.

FIG. 8 illustrates example operations for identifying an actor and an object to be received therefrom by robotic device 701. In order to identify an actor, robotic device 701 may be configured to fit a digital virtual (i.e., a digital representation approximating an actual/physical bone skeleton) to the sensor data received from the sensor in robotic head 712. Successfully fitting a virtual skeleton to this sensor data may indicate the presence of an actor within the portion of the environment represented by the sensor data. Additionally or alternatively, robotic device 701 may use other computer vision, machine learning, or artificial intelligence techniques to identify actors in the sensor data.

When actor 700 is a human, the virtual skeleton may be a human virtual skeleton which includes a head node 800, neck node 802, shoulder nodes 804A and 804B, elbow nodes 806A and 806B, hand nodes 808A and 808B, pelvic node 810, hip nodes 812A and 812B, knee nodes 814A and 814B, and foot nodes 816A and 816B (i.e., nodes 800-816B). Nodes 800-816B may be interconnected as shown in FIG. 8 to form the human virtual skeleton. The spacing of nodes 800-816B may vary according to the size of the detected human.

Alternatively, in some implementations, the virtual skeleton may represent a robotic actor (i.e. another robotic device), or an actor of a different species than human and which is also capable of handing objects over to robotic device 701 or receiving objects therefrom. Fitting the virtual skeleton to actor 700 may be accomplished using, for example, energy minimization of geodesic distance features, among other possible algorithms.

Fitting the virtual skeleton to actor 700 may allow robotic device 701 to determine whether actor 700 is present near robotic device 701 and whether actor 700 is holding an object that can be handed over to robotic device 701. To that end, robotic device 701 may additionally analyze sensor data from sensors in robotic head 712 to identify therein any objects that robotic device 701 is capable of receiving. Robotic device 701 may, for example, use computer vision, machine learning, or artificial intelligence algorithms (e.g., artificial neural networks) to identify and classify objects within the sensor data. Robotic device 701 may thus identify cup 702 and the shoes worn by actor 700 as candidate objects for hand-over from actor 700 to robotic device 701.

Robotic device 701 may further determine which of the identified candidate objects are held, carried, or otherwise physically associated with actor 700 in a manner indicating that the object is available for hand-over from actor 700 to robotic device 701. A candidate object may be determined to be held, carried, or physically associated with actor 700 when the candidate object and the virtual skeleton match a predetermined configuration or fit into a predetermined range of configurations. Robotic device 701 may thus filter objects available for hand-over out of all the objects present in the portion of the environment represented by the sensor data.

An example predetermined configuration may include the virtual skeleton having a first arm bent with the candidate object positioned near the hand of the first arm. Another example predetermined configuration may include the virtual skeleton standing on a first leg, with a second leg raised and pointed towards robotic device 701 so as to indicate an intent to have robotic device 701 take a shoe off of the foot of the second leg. An example of an arrangement of an object and the virtual skeleton that does not match a predefined configuration may be a mug on a table nearby actor 700 but which is not held by actor 700.

VI. Example Object Hand-Over Operations: Actor to Robot

Figure 9A:
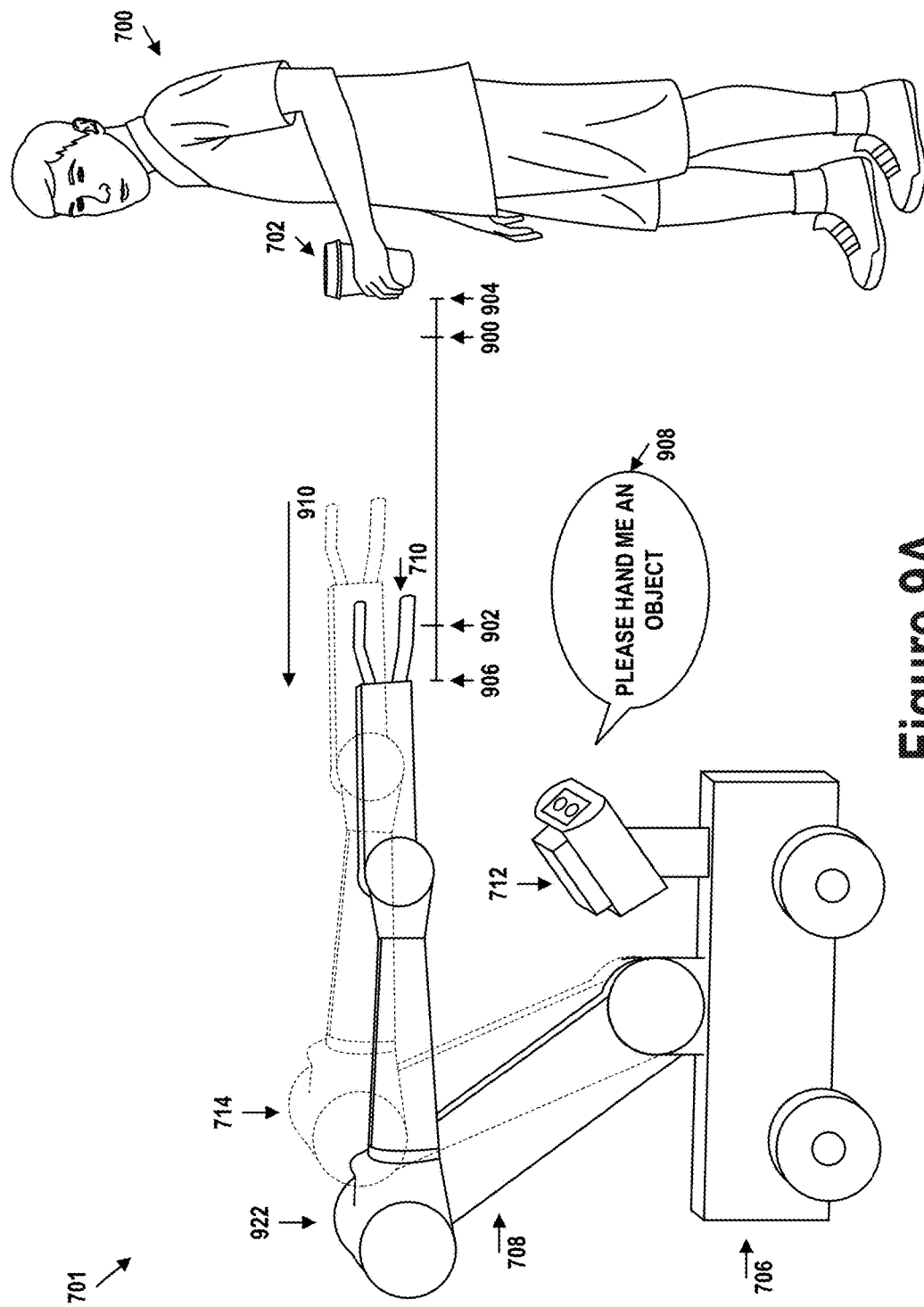
FIGS. 9A, 9B, 9C, 9D, and 9E illustrate hand-over of an object from an actor to a robotic device, in accordance with example embodiments.

After an object is identified for hand-over from actor 700 to robotic device 701, robotic device 701 may interact with actor 700 by way of audible, visual, or physical cues or gestures to indicate that robotic device 701 is ready to receive an object from actor 700. The cues or gestures may be generated by both actor 700 and robotic device 701 to effect two-way communication. FIG. 9A illustrates example cues exhibited by robotic device 701 intended to inform actor 700 that robotic device 701 is ready to receive cup 702 therefrom. Robotic device 701 may generate, by way of one or more speakers in robotic head 712 (or in other parts of robotic device 701), audible statement 908 asking actor 700 to hand an object to robotic device 701. Additionally, robotic device 701 may reposition robotic arm 708 from pose 714 to pose 922, as indicated by arrow 910, thereby gesturing to actor 700 that actor 700 is tasked with initiating hand-over of cup 702. Further, robotic head 712 may be reoriented from the orientation shown in FIG. 7 to look at gripper 710, as shown in FIG. 9A, thereby exhibiting another gesture indicating to actor 700 that actor 700 is tasked with initiating hand-over of cup 702.

In some implementations, robotic device 701 may generate fewer cues (e.g., generate statement 908 or reposition arm 708, but not both). Robotic device may also use additional cues such as displaying instructions to hand-over the object on a display (not shown) on robotic device 701. Additionally, in some cases, robotic device 701 may generate a series of cues. For example, robotic device 701 might first ask actor 700 whether actor 700 would like robotic device 701 to take anything from actor 700. Actor 700 might then indicate that actor 700 would like robotic device 701 to take an object from actor 700 by uttering an affirmative response, nodding his or her head, or gesturing by moving the object towards robotic device 701. In response to such an affirmative reply, robotic device 701 may then request (e.g., audibly, visually, or via physical gesture) that actor 700 hand the object to robotic device 701.

The audible or physical cues of actor 700 detected by robotic device 701 may cause robotic device 701 to operate in a receive-object mode. Operating in the receive-object mode may involve robotic device 701 or a control system thereof coordinating motion of robotic arm 708 with positions of cup 702 to complete a hand-over of cup 702 from actor 700 to arm 708. To that end, in the receive-object mode, robotic device 701 may be configured to receive depth data from the depth sensor disposed within the palm of gripper 710. The depth data may allow robotic device 701 to adjust the position of arm 708 to coordinate with actor 700 in hand-over of cup 702 as actor 700 repositions cup 702 relative to gripper 710.

FIG. 9A illustrates cup 702 located at position 904, the palm of gripper 710 located at position 906 when in pose 922, first threshold position 900, and second threshold position 902. Accordingly, the difference between positions 904 and 906 represents the distance between the palm of gripper 710 and cup 702, as indicated by the depth data. The difference between positions 904 and 900 represents a first threshold distance and, similarly, the difference between positions 904 and 902 represents a second threshold distance. The first and second threshold distances may dictate how arm 708 moves in response to changes in position of cup 702.

When operating in the receive-object mode, robotic device 701 may be configured to (i) remain in a fixed position when the distance between the palm and cup 702 is greater than the second threshold distance (i.e., when position 906 is left of position 902), (ii) move towards cup 702 when the distance between the palm and cup 702 is lower than the second threshold distance and greater than the first threshold distance (i.e., when position 906 is between positions 900 and 902), and (iii) close gripper 710 when the distance between the palm and cup 702 is less than the first threshold distance (i.e., when position 906 is right of position 900). Such behavior may allow for an intuitive and human-friendly manner of receiving cup 702 from actor 700 in which actor 700 is able to control operation of robotic device 701 by way of simple, easy-to-understand gestures.

In some implementations, moving arm 708 from pose 714 to pose 922 may be part of the receive-object procedure. Notably, moving arm 708 from pose 714 to pose 922 may involve moving the palm of gripper 710 beyond the second threshold distance such that position 906 is to the left of position 902, as illustrated in FIG. 9A. Moving the palm beyond the second threshold distance will cause arm 708 to remain in a fixed position until cup 702 is brought within the second threshold distance. This allows actor 700 to initiate the hand-over of cup 702 whenever actor 700 is ready, rather than having arm 708 proceed to automatically move closer to cup 702. Having robotic device 701 initiate hand-over by automatically reaching for cup 702 may be intimidating to actor 700. Thus, allowing actor 700 to initiate the hand-over in this way may be more user-friendly and may provide actor 700 with increased control over actions of robotic device 701. The distance beyond the second threshold by which arm 708 is initially moved (i.e., the distance between position 902 when arm 708 is in pose 922 and position 902) may be configurable based on preferences of actor 700. A larger distance may require a larger movement of cup 702 by actor 700 to initiate hand-over, and, similarly, a smaller distance may require a smaller movement of cup 702 by actor 700 to initiate hand-over.

Alternatively, in some implementations, moving arm 708 from pose 714 to pose 922 might not move the palm of gripper 710 beyond the second threshold distance (i.e., position 906 may be to the right of position 902). Robotic device 701 may nevertheless be configured to maintain arm 708 in a fixed position until actor 700 indicates intent to hand cup 702 over by, for example, moving cup 702 towards gripper 710 by at least a predetermined distance. Robotic device 701 may also be configured to detect an audible utterance by actor 700 indicating to robotic device 701 to start moving gripper 710 towards cup 702.

In some implementations, the first threshold distance and the second threshold distance may be adjustable. A mobile computing device communicatively connected to robotic device 701 may be used (e.g., by actor 700) to adjust the first and second threshold values to match the preferences of actor 700. Increasing the second threshold distance may result in robotic device 701 needing less input from actor 700 before it starts advancing gripper 710 towards cup 702. Additionally, in some implementation, robotic device 701 may automatically adjust the first threshold based on the size of the object and the second threshold based on the environment. For example, in a large, open room, a larger threshold may be used to allow arm 708 to travel through most of the distance between gripper 710 and cup 702. In a smaller space, however, a large second threshold could lead to too many unintended grabs (e.g., due to actor 700 not having enough space to move cup 702 away). The second threshold may thus be reduced to accommodate the smaller space.

Figure 9B:
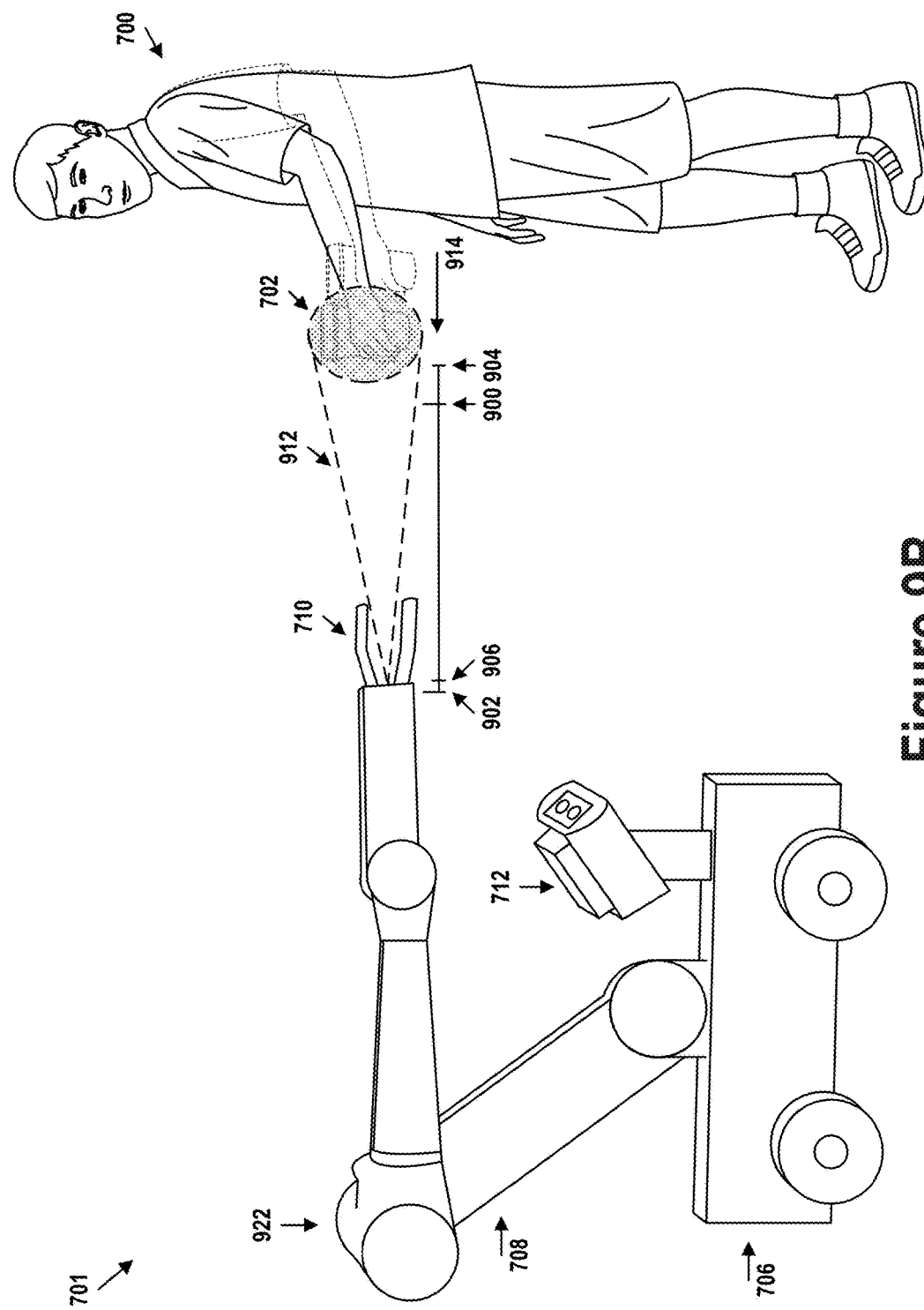

FIG. 9B illustrates actor 700 initiating hand-over of cup 702 by moving cup 702 from the position illustrated in FIG. 9A, indicated by the arm in dashed lines, to a position closer to gripper 710, as indicated by line 914. Moving cup 702 close to gripper 710 decreases the distance between the palm of gripper 710 and cup 702 (i.e., brings positions 904 and 906 closer together), thereby moving position 906 to the left of second threshold position 902. The decreased distance between the palm and cup 702 may be determined by robotic device 701 by repeatedly scanning cup 702 using the depth sensor disposed within the palm, as indicated by field of view 912. With the distance between the palm and cup 702 now being less than the second threshold distance, arm 708 may proceed to move gripper 710 closer to cup 702.

Figure 9C:
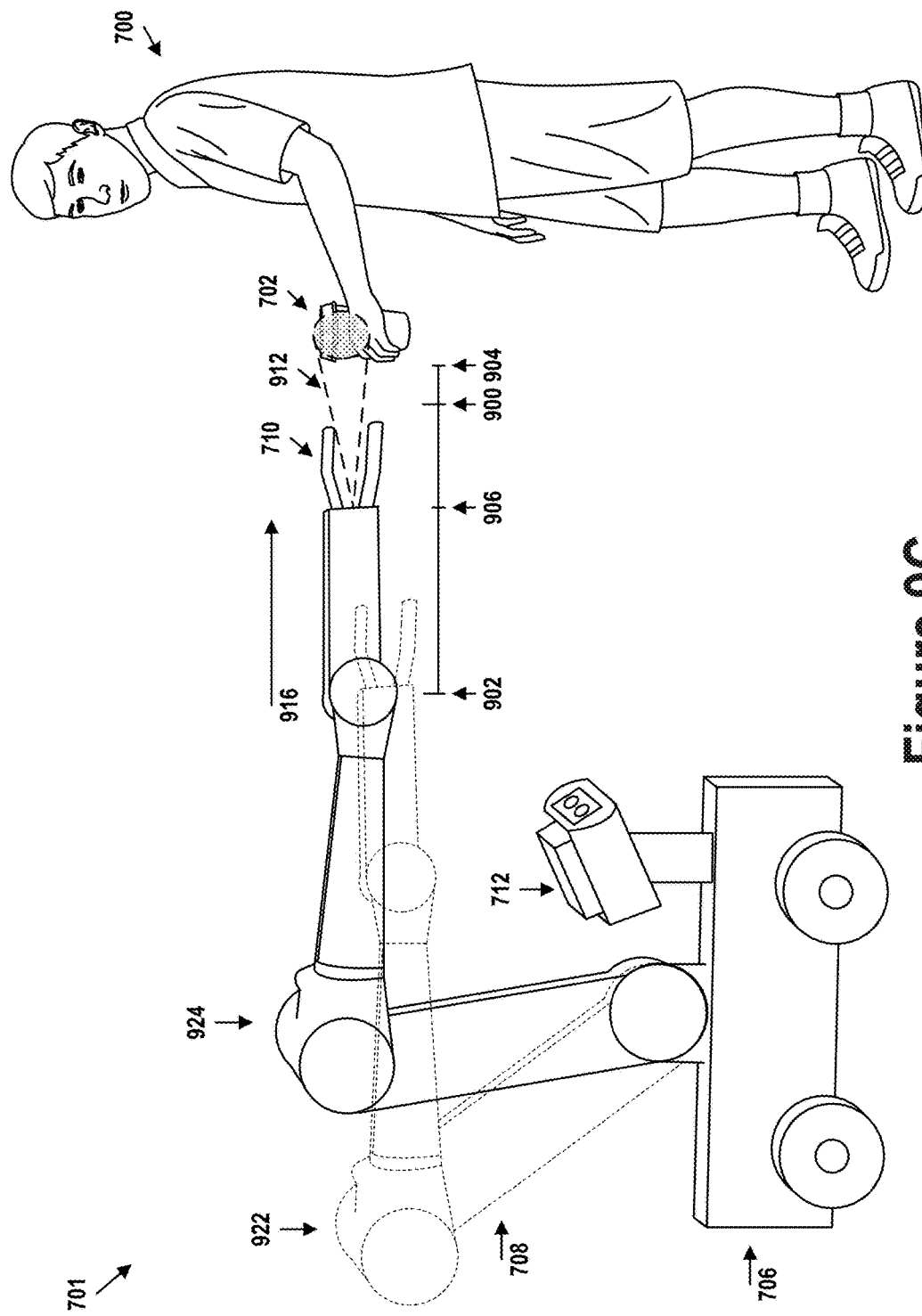

FIG. 9C illustrates arm 708 moved from pose 922 to pose 924, as indicated by line 916, to place gripper 710 closer to cup 702. Notably, position 906 of the palm is now closer to first threshold position 900 than it was in FIG. 9B. The depth sensor disposed within the palm may continue to generate depth data indicative of the distance between cup 702 and the palm of gripper 710, as indicated by field of view 912. Field of view 912 may decrease as cup 702 gets closer to gripper 710 (although the angle of view may remain the same). Additionally, the orientation of robotic head 712 may be adjusted to keep gripper 710 within a field of view of the sensors in robotic head 712. In some implementations, the speed with which gripper 710 advances towards cup 702 may be based on the distance therebetween. For example, as the distance between gripper 710 and cup 702 decreases, arm 708 may move slower to allow gripper 710 to engage cup 702 slowly and gently.

Notably, actor 700 may, at any time, move cup 702 away from gripper 710 to indicate to robotic device 701 that actor 700 no longer wishes to hand cup 702 over. When cup 702 is moved sufficiently far away such that the distance between the palm of gripper 710 and cup 702 again exceeds the second threshold distance (i.e., position 906 is moved to the left of position 902), arm 708 may stop moving towards cup 702.

Actor 700 may indicate continued interest in handing cup 702 over by not moving it away from gripper 710 or by returning cup 702 to within the second threshold distance. Thus, actor 700 may have complete control over the hand-over process. This is in contrast to hand-over approaches that involve repositioning the robotic arm to follow the object as its position is modified by the actor. Robotic device 701 is configured to approach cup 702 while the physical actions of actor 700 indicate an intent to hand the cup over. Robotic device 701 may, however, refrain from approaching or following cup 702 when the actor positions cup 702 in a manner indicating a lack of intent to hand it over.

In implementations where arm 708 is mounted to a fixed base, actor 700 may position cup 702 such that the range of motion of arm 708 allows gripper 710 to reach cup 702. On the other hand, when arm 708 is mounted to mobile base 706, mobile base 706 may be used to reposition arm 708 to follow actor 700 while the distance between the palm and cup 702 remains between the first and second threshold distances. In some implementations, mobile base 706 may be used when the full horizontal reach of arm 708 is used up. Alternatively, mobile base 706 may be used before arm 708 reaches full horizontal extension, thus allowing for additional positional adjustments using arm 708 and not just mobile base 706.

Figure 9D:
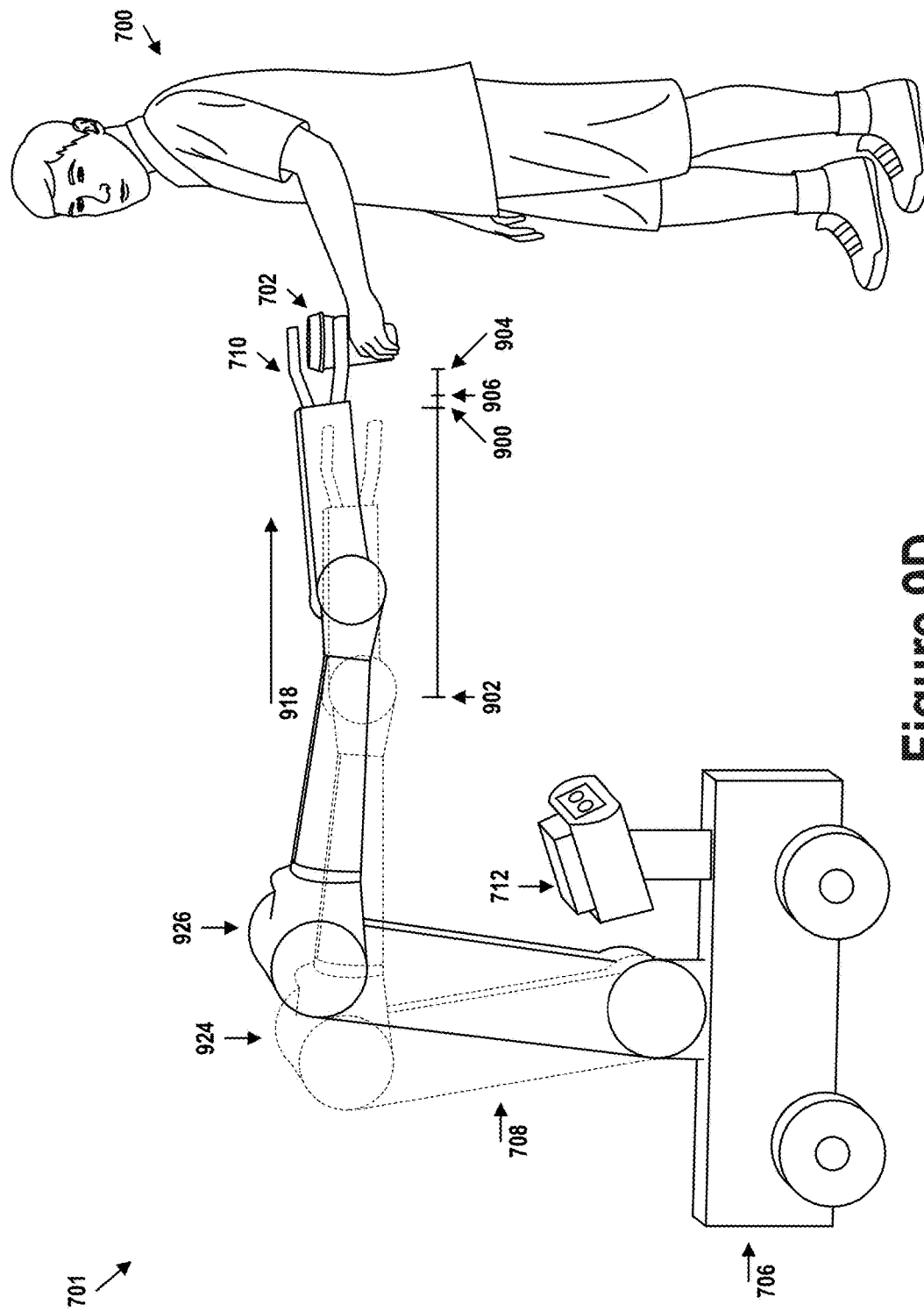

As arm 708 continues to move gripper 710 towards cup 702, the palm of gripper 710 may eventually be positioned within the first threshold distance (i.e., between positions 900 and 904), as illustrated in FIG. 9D. Arm 708 may be moved from pose 924 to pose 926, as indicated by arrow 918. The orientation of robotic head 712 may again be adjusted to keep gripper 710 within the field of view of the sensors in robotic head 712. When the distance between the palm of gripper 710 and cup 702 is smaller than the first threshold distance, gripper 710 may close around cup 702.

The first threshold distance (i.e., the position 900 relative to position 904) may be selected based on the type of gripper used by robotic device 701 or the object to be grasped thereby, among other factors. For example, a small gripper may have to be placed very close to an object to get a good grasp thereof, thus dictating a small first threshold distance. A large gripper, on the contrary, may have a longer grasping surface which may be able to grasp objects positioned near its base, middle, or tip, thus allowing a larger first threshold distance. Similarly, a large object may dictate that gripper 710 come close to the object to grasp the entirety thereof, thus dictating a small first threshold distance, while a smaller object may be graspable with only a portion of gripper 710, thus allowing a large first threshold distance.

Figure 9E:
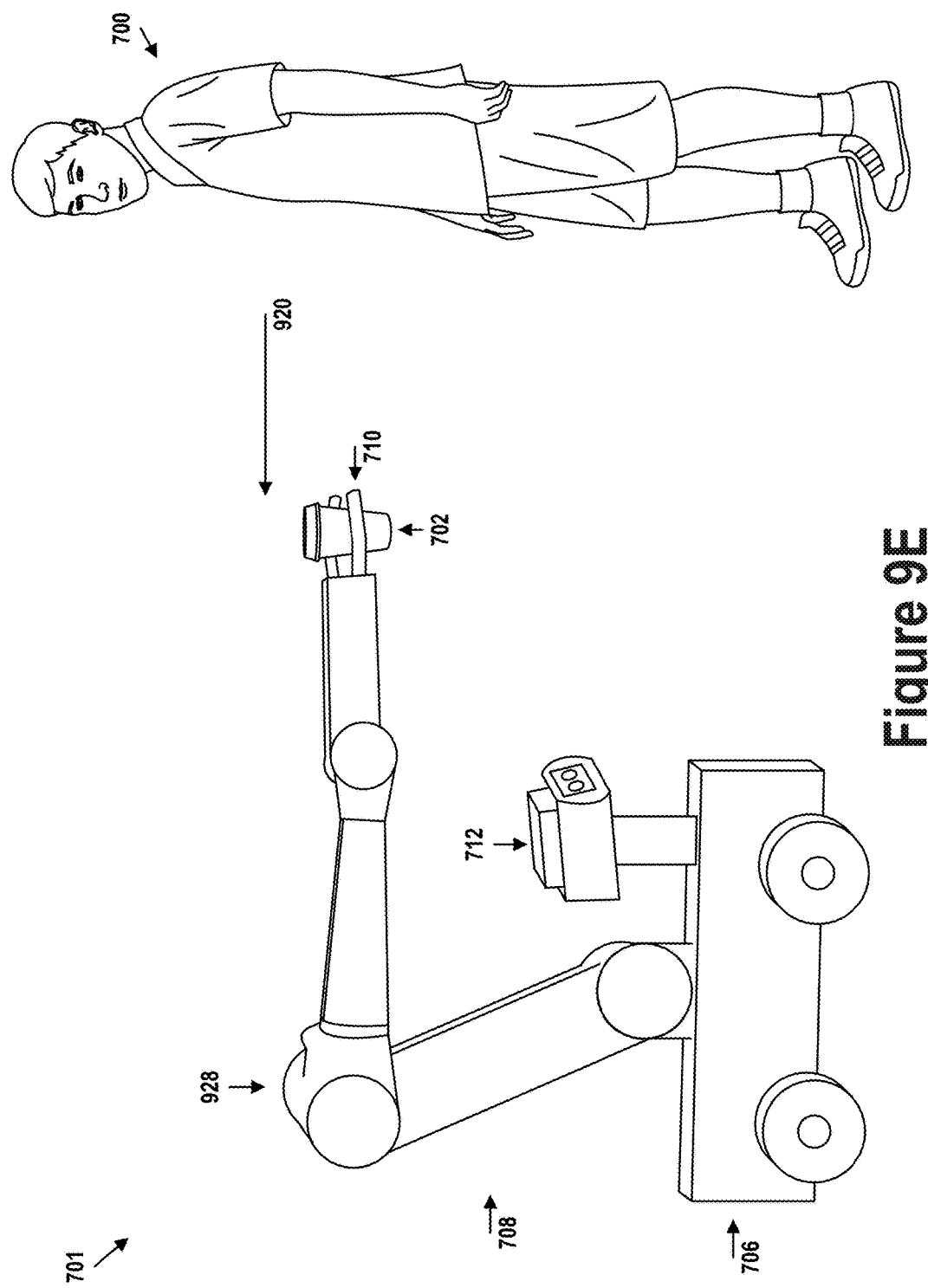

Once gripper 710 grasps cup 702, arm 708 may begin to pull back on cup 702, indicating to actor 700 that robotic device 701 is ready to take cup 702 away. This initial pull on cup 702 may exert thereon a force large enough to indicate to actor 700 the intent of robotic device 701 to remove cup 702 from the hand of actor 700, but not so strong as to remove cup 702 forcefully. A force-torque sensor in robotic arm 708 or gripper 710 may measure the amount of force exerted on cup 702 by arm 708 as it moves cup 702 away from actor 700. When the amount of force drops below a threshold, indicating that actor 700 has released cup 702, arm 708 may move cup 702 away from actor 700 to pose 928, as illustrated by line 920 in FIG. 9E.

In some implementations, robotic device 701 may additionally or alternatively rely on sensor data from vision sensors in robotic head 712 to determine that actor 700 has released cup 702. For example, robotic device 701 may determine that actor 700 has released cup 702 when a distance between cup 702 and the hand of actor 700, as measured based on the sensor data, exceeds an object-release threshold.

The speed with which arm 708 moves may be slow (e.g., under a first speed threshold) when actor 700 is still holding cup 702, but may be increased to higher speeds (e.g., above the first speed threshold) after actor 700 releases cup 702. After cup 702 is handed over from actor 700 to robotic device 701, robotic device 701 may exit the receive-object mode and may resume other operations within the environment. Robotic head 712 may resume scanning the environment, rather than following motion of gripper 710, to indicate that robotic device 701 has left the receive-object mode.

Data from the force-torque sensor may be similarly used to facilitate hand-over of an object from robotic device 701 to actor 700. Namely, when a force above a threshold is detected by the force-torque sensor, gripper 710 may open up to allow actor 700 to remove the object therefrom.

While in the receive-object mode, vision sensors in robotic head 712 or the camera disposed within the palm of gripper 710 may be used to verify that the distance measured by the depth sensor disposed within the palm represents a distance between the palm and cup 702, rather than between the palm and another object in the environment. To that end, robotic head 712 is shown tracking gripper 710 in FIGS. 9A-9D, with the orientation of robotic head 712 changing along with the position of gripper 710.

In one example, a field of view of the camera in the palm may overlap with a field of view of the depth sensor. Robotic device 701 may execute object recognition and classification algorithms on data from the camera while receiving sensor data from the depth sensor. When cup 702 is recognized in the image data from the camera and is classified as a cup, arm 708 may be operated based on the depth data as described above. However, when cup 702 is not recognized and classified as a cup, robotic arm 708 may be stopped to avoid colliding with unexpected objects in its path. Verifying the distance measurement in this way may allow robotic device 701 to avoid operating arm 708 and gripper 710 based on false-positive distance measurements resulting from, for example, another object or actor temporarily interposing between gripper 710 and cup 702.

As actor 700 waits for gripper 710 to grasp cup 702, actor 700 may vary the vertical (i.e., up and down), lateral (i.e., side-to-side or in-and-out of the page, as shown in FIGS. 9A-9E), and horizontal (back and forth or left and right along the page, as shown in FIGS. 9A-9E) positions of cup 702. Such movement may be intentional movement intended to communicate an intent of actor 700 to robotic device 701, or unintentional movement resulting from random changes in the position of actor 700 or limbs thereof. Robotic device 701 may be configured to distinguish between intentional and unintentional movements based on distance, velocity, and acceleration of the movements.

When cup 702 is moved beyond a threshold distance (i.e., a third threshold distance), with a speed greater than a threshold speed, and/or with an acceleration greater than a threshold acceleration, robotic device 701 may be configured to keep arm 708 in a fixed position rather than causing arm 708 to follow or continue to move closer to cup 702. This type of motion may indicate a lack of intent on the part of actor 700 to hand cup 702 over to robotic device 701. On the other hand, when cup 702 in not moved beyond the second threshold distance, is not moved with a speed greater than the threshold speed, and/or is not moved with an acceleration greater than the threshold acceleration, arm 708 may be repositioned such that gripper 710 follows cup 702 along any of the vertical, lateral, or horizontal directions.

In some implementations, the threshold distance, the threshold speed, and the threshold acceleration may each be user-configurable parameters. These parameters may be modified via, for example, a mobile computing device communicatively connected to robotic device 701. By modifying the values of these parameters, the response of robotic device 701 may be adjusted to individual actors' preferences.

The position, speed, and acceleration of cup 702 may be determined based on data from the depth sensor in the palm, the camera in the palm, sensors in robotic head 712, or any other sensors present on robotic device 701. Position, speed, and acceleration of cup 702 may be tracked using, for example, optical flow in image data. For example, when cup 702 is moved out of the page by actor 700, cup 702 would eventually leave the field of view of the depth sensor in the palm. When this movement is determined to be unintentional, position of arm 708 may be adjusted based on images from the camera in the palm to follow cup 702 and maintain it within field of view 912 of the depth sensor.

Alternatively, in some implementations, while in the receive-object mode, robotic device 701 may be configured to move only in the left and right direction along the page as drawn in FIGS. 9A-9E. When cup 702 is moved (e.g., up, down, into the page, or out of the page) out of field of view 912, motion of arm 708 may be stopped and arm 708 may be maintained in a fixed position until actor 700 again placed cup 702 within field of view 912. Operating in this way may minimize or eliminate ambiguities in interpreting the intentions of actor 700 when cup 702 is moved outside of field of view 912. Actor 700 may thus quickly pause the object hand-over by moving cup 702 out of field of view 912 and may equally quickly resume the hand-over by moving cup 702 back into field of view 912.

Figure 10:
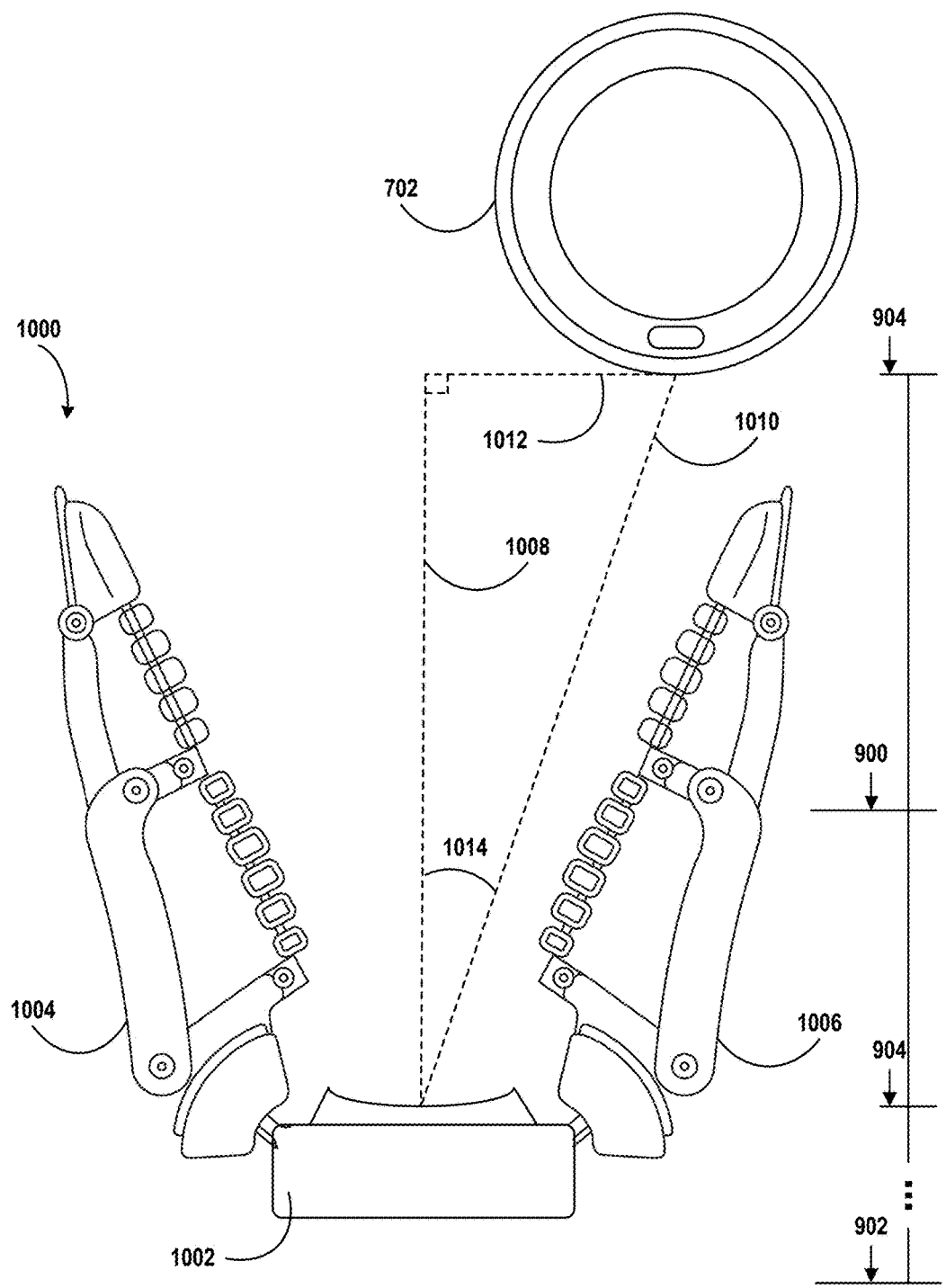
FIG. 10 illustrates a distance between a palm of a robotic gripper and an object, in accordance with example embodiments.

FIG. 10 illustrates how a perpendicular distance between the palm of a gripper and an object may be determined such that the distance measurement is independent of the position of the object within the field of view of the depth sensor. FIG. 10 illustrates gripper 1000 having palm 1002 and underactuated digits 1004 and 1006. Gripper 1000 may represent gripper 710 or be a variation thereof.

When cup 702 is not centered in the field of view of the depth sensor within palm 1002, the distance between cup 702 and palm 1002 may be represented by line 1010. Since the length of line 1010 varies as the side-to-side positioning of cup 702 within the field of view changes (i.e., distance 1010 depends on distance 1012), different side-to-side positions may cause robotic arm 708 to behave differently in spite of cup 702 not actually moving closer to (i.e., down along the page) or further away from (i.e., up along the page) gripper 1000. For example, since distance 1010 is longer than distance 1008, comparing distance 1010 to the first threshold distance may cause closing of gripper 1000 to be delayed due to gripper 1000 having to be moved closer to cup 702 to trigger gripping. Such variation may result in the behavior of the robotic device being unpredictable to the actor, which may make the actor hesitant to interact with the robotic device.

Distance 1008, however, remains consistent regardless of the side-to-side positioning of cup 702. Robotic device may thus determine distance 1008, representing the component of distance 1010 that is perpendicular to palm 1002, based on distance 1010 and angle 1014. Angle 1014 may be determined based on the length of distance 1012 in pixels, which may be determined from image data, and the total angle of view of the camera that captured the image data. Namely, angle 1014 may be determined by multiplying the number of pixels representing distance 1012 by the number of degrees per pixel for the camera. With angle 1014 now known, distance 1008 may be determined using trigonometric relations of distance 1008, distance 1010, and angle 1014.

Although distance 1010 is shown measured to a frontmost point on cup 702, distance 1010 may alternatively be measured relative to another fiducial on cup 702 (e.g., a logo or a geometric feature thereon). Similarly, in some implementations, distance 1010 may represent the average distance across all points measured by the depth sensor along the observable surface of cup 702. Such alternative ways of defining distance 1010 also vary with the side-to-side positioning of cup 702 and may therefore be corrected by computing distance 1008 as discussed above. Additionally, a similar correction may be applied to account for cup 702 being moved in and out of the page, as drawn.

VII. Additional Example Operations

Figure 11:
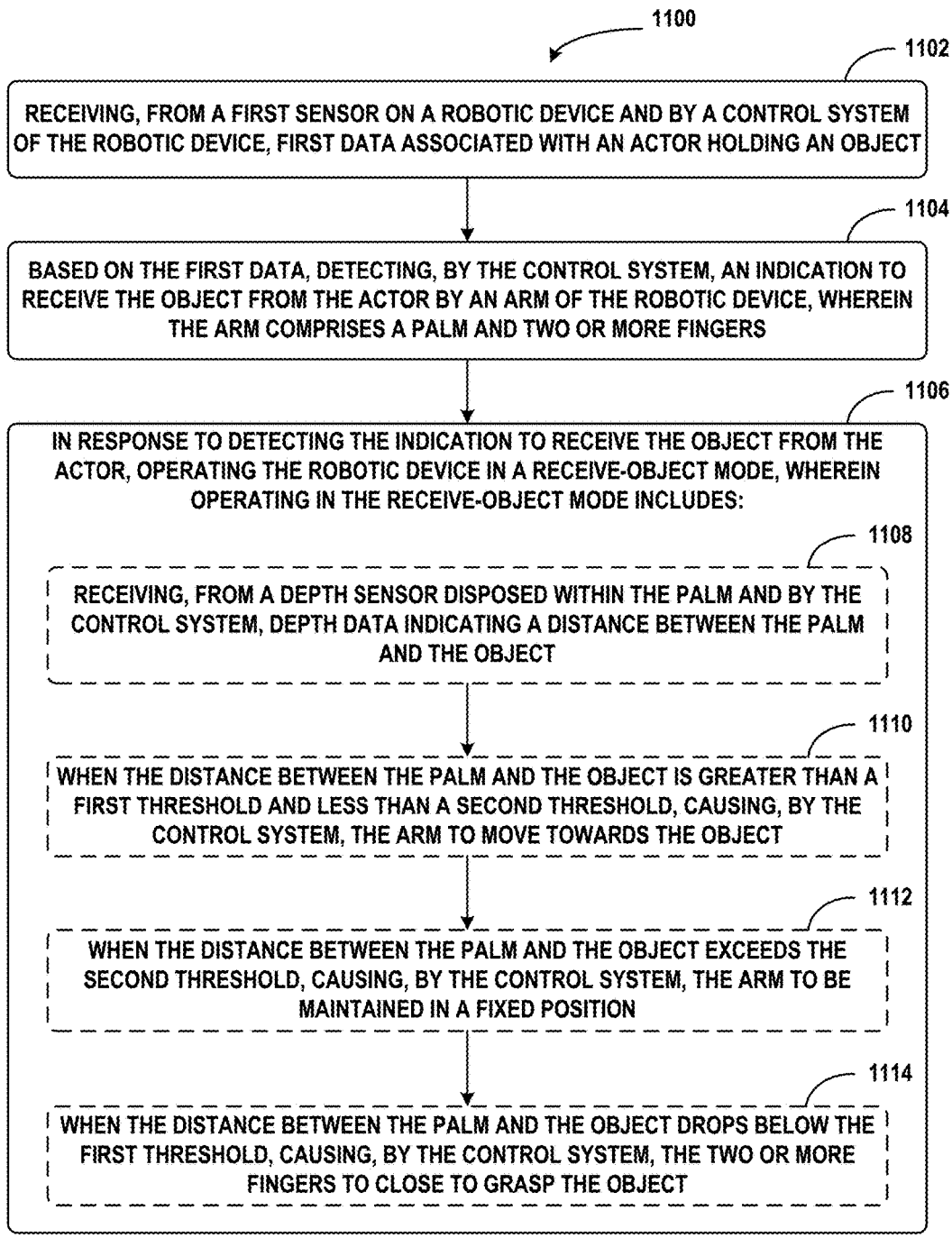
FIG. 11 illustrates a flow chart, in accordance with example embodiments.

FIG. 11 illustrates flow chart 1100 of operations related to receiving an object from an actor. The operations may be carried out by robotic system 100, robotic arm 200, robotic device 701, control systems thereof, or other computing devices associated therewith. The operations may be similar to and may include variations of the operations discussed with respect to FIGS. 7-10.

Block 1102 may involve receiving, from a first sensor on a robotic device and by a control system of the robotic device, first data associated with an actor holding an object.

Block 1104 may involve, based on the first data, detecting, by the control system, an indication to receive the object from the actor by an arm of the robotic device. The arm may include a palm and two or more fingers.

Block 1106 may involve in response to detecting the indication to receive the object from the actor, operating the robotic device in a receive-object mode. Operating in the receive-object mode may include performing the operations of blocks 1108, 1110, 1112, and 1114.

Block 1108 may involve receiving, from a depth sensor disposed within the palm and by the control system, depth data indicating a distance between the palm and the object.

Block 1110 may involve, when the distance between the palm and the object is greater than a first threshold and less than a second threshold, causing, by the control system, the arm to move towards the object.

Block 1112 may involve, when the distance between the palm and the object exceeds the second threshold, causing, by the control system, the arm to be maintained in a fixed position.

Block 1114 may involve, when the distance between the palm and the object drops below the first threshold, causing, by the control system, the two or more fingers to close to grasp the object.

In some embodiments, operating in the receive-object mode may also include moving the arm into a first position to wait for hand-over of the object from the actor.

In some embodiments, moving the arm into the first position may include moving the arm away from the object to a distance outside of the second threshold to gesture that the robotic device is in the receive-object mode and is ready to receive the object from the actor.

In some embodiments, moving the arm into the first position may include moving the arm along a predetermined trajectory to gesture that the robotic device is in the receive-object mode and is ready to receive the object from the actor.

In some embodiments, operating in the receive-object mode may also include determining the distance between the palm and the object based on a perpendicular component of a distance represented by the depth data. The first threshold and the second threshold may each represent respective distances along an axis perpendicular to the palm.

In some embodiments, operating in the receive-object mode may also include receiving, from an image sensor on the robotic device, image data indicating a position of the object relative to the palm. Based on the image data, a lateral position of the arm may be adjusted to place the object within a field of view of the depth sensor.

In some embodiments, the first sensor may include an image sensor and the first data may be image data. Detecting the indication to receive the object from the actor may include identifying, based on the image data, (i) the object and (ii) a virtual skeleton representing the actor. The indication to receive the object from the actor may be detected based on a pose of the virtual skeleton and a position of the object relative to the virtual skeleton reaching a predetermined configuration.

In some embodiments, the first sensor may include a microphone communicatively connected to the robotic device or a control system thereof. Detecting the indication to receive the object from the actor may include detecting, by way of the microphone, an utterance by the actor and determining that the utterance indicates to receive the object from the actor.

In some embodiments, the first sensor may be an image sensor and the first data may be image data. The robotic device may also include an audio speaker and a microphone. Detecting the indication to receive the object from the actor may include identifying, based on the image data, (i) the object and (ii) a virtual skeleton representing the actor. In response to a pose of the virtual skeleton and a position of the object relative to the virtual skeleton reaching a predetermined configuration, the audio speaker may be caused to generate an utterance requesting hand-over of the object from the actor to the arm. An utterance by the actor indicating to receive the object from the actor may be detected by way of the microphone.

In some embodiments, operating in the receive-object mode may involve causing the two or more fingers to open to expose the depth sensor disposed within the palm before receiving the depth data.

In some embodiments, the first sensor may include an image sensor. Operating in the receive-object mode may also include receiving, from the image sensor, image data representing the actor holding the object. Based on the image data, the robotic device may verify that the depth data received from the depth sensor indicates the distance between the palm and the object.

In some embodiments, the robotic device may include an image sensor disposed within the palm. Operating in the receive-object mode may include receiving, from the image sensor, image data representing the actor holding the object. Based on the image data, the robotic device may verify that the depth data received from the depth sensor indicates the distance between the palm and the object.

In some embodiments, operating in the receive-object mode may also include determining a speed with which to move the arm towards the object based on the distance between the palm and the object.

In some embodiments, the depth sensor disposed within the palm may include a first time-of-flight sensor having a first range and a second time-of-flight sensor having a second range greater than the first range. Receive the depth data may include receiving first depth data from the first time-of-flight sensor and second depth data from the second time-of-flight sensor. The distance between the palm and the object may be determined based on at least one of the first depth data and the second depth data.

VIII. Example Object Hand-Over Operations: Robot to Actor

Figure 12B:
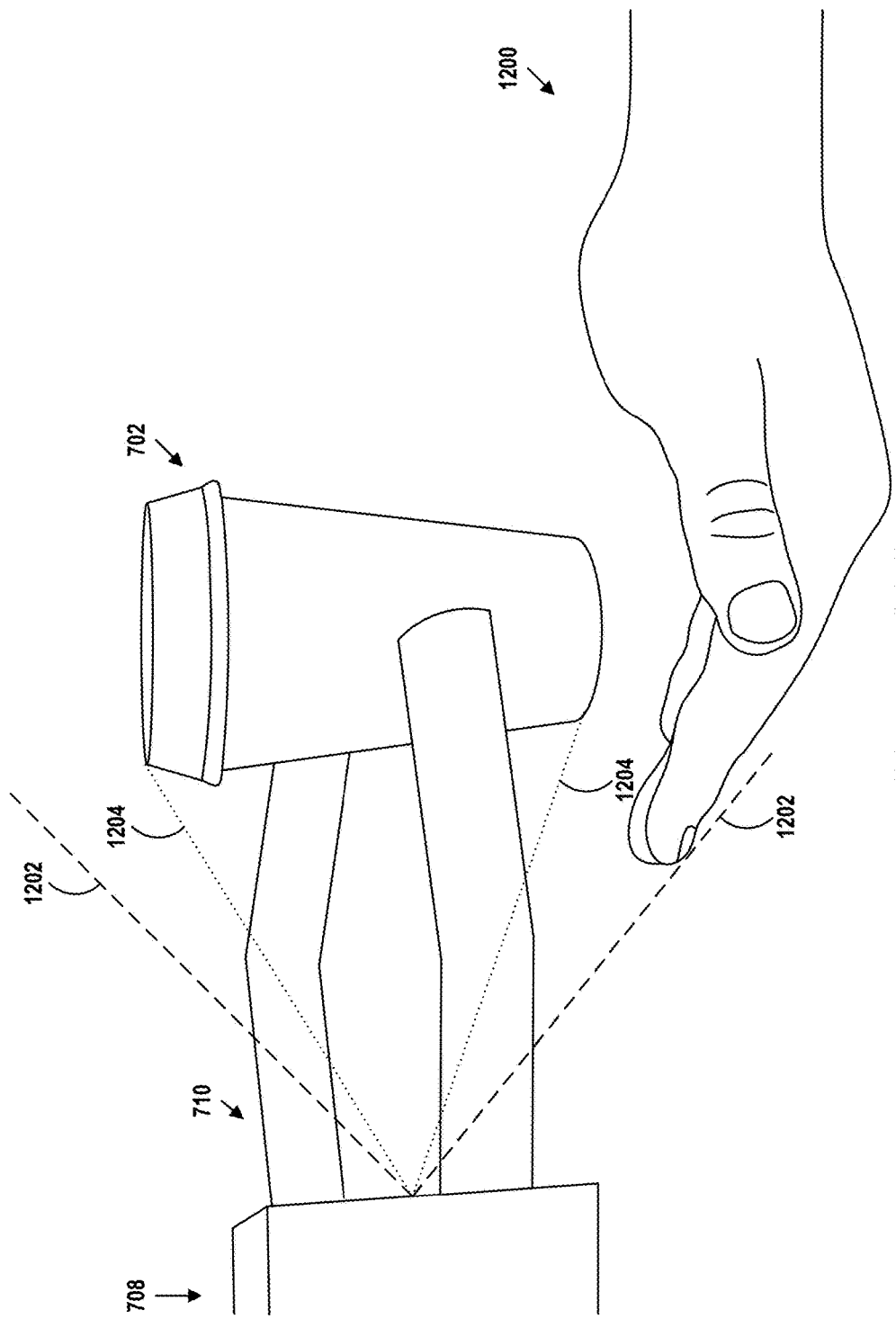
Figure 12C:
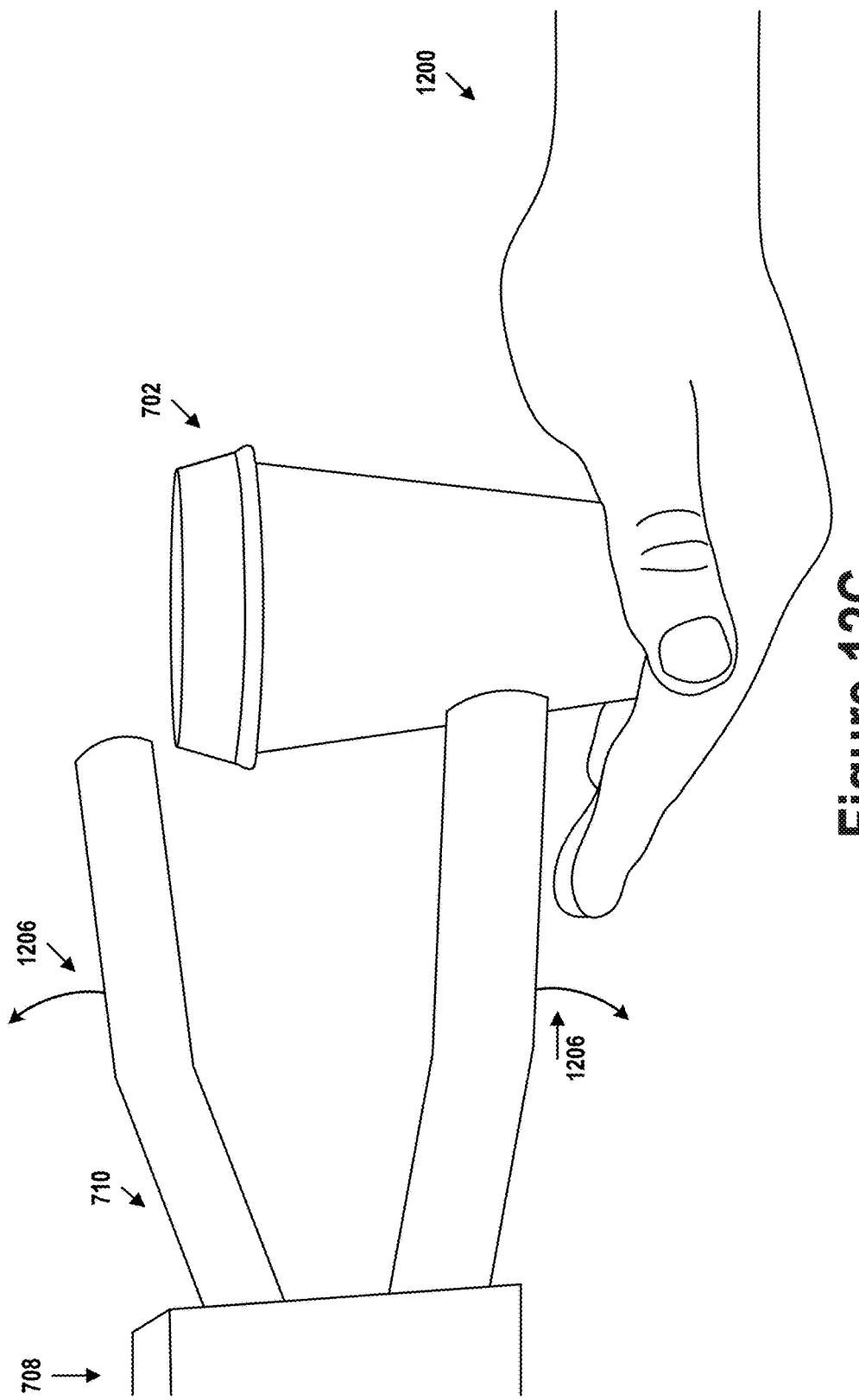
Figure 13B:
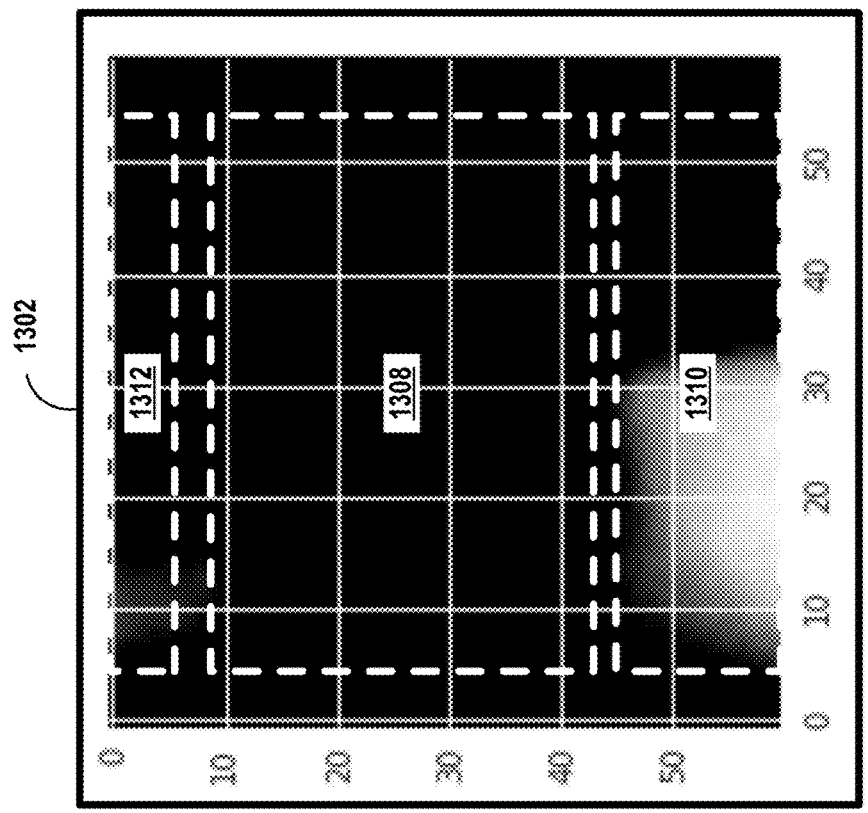
FIGS. 13A, 13B, 13C, and 13D illustrate images from an image sensor in a gripper, in accordance with example embodiments.
Figure 13A:
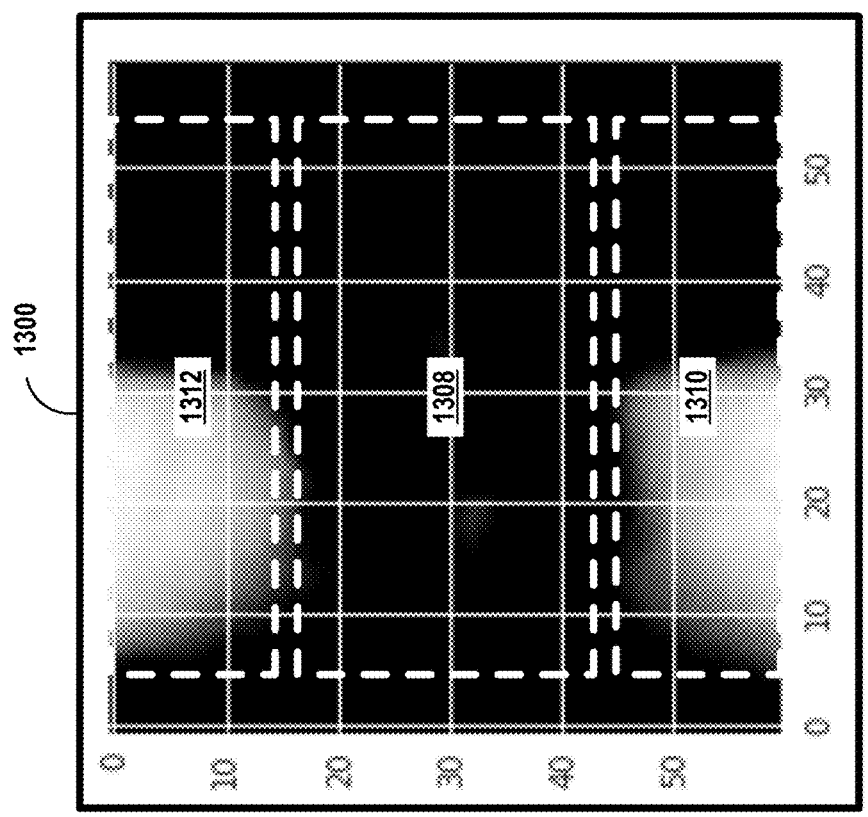
Figure 13D:
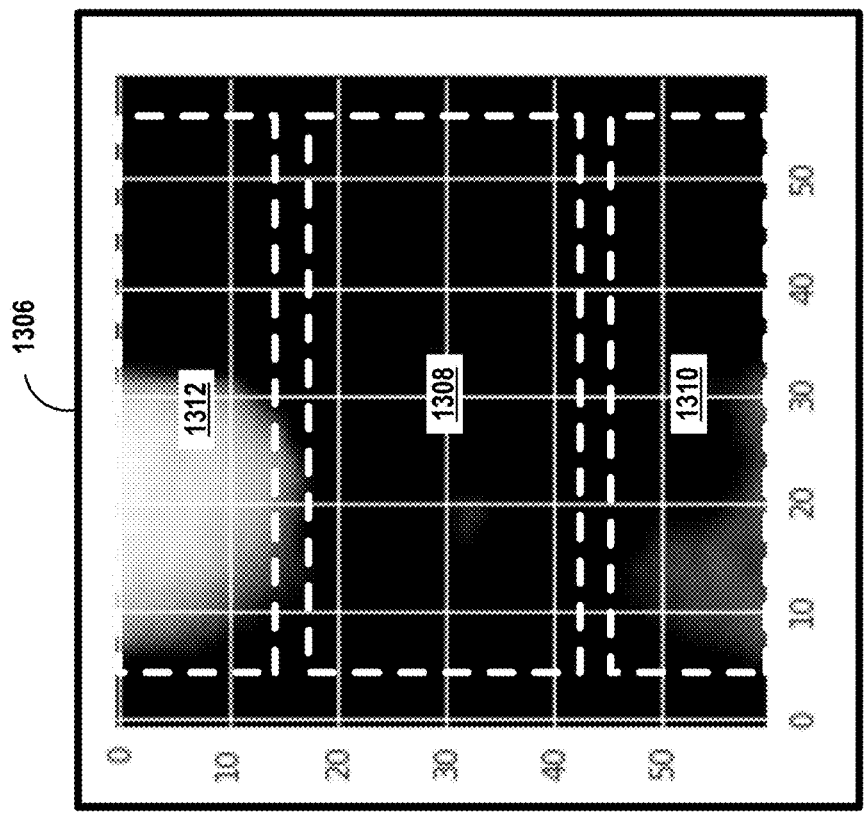
Figure 13C:
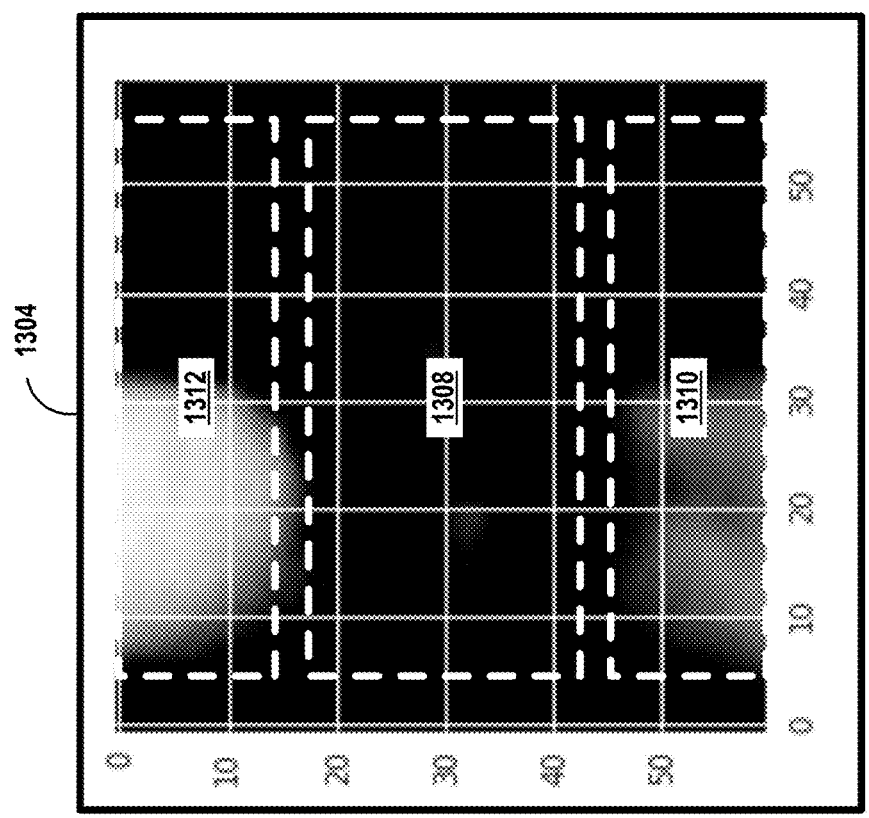

In addition to receiving an object from actor 700, robotic device 701 may also be configured to hand an object over to actor 701. Such robot-to-actor handover may be facilitated by using data from the depth sensor disposed in the palm, the camera disposed in the palm, vision sensors in robotic head 712, or a combination thereof. FIGS. 12A, 12B, and 12C illustrate an example handover procedure of cup 702 from gripper 710 to hand 1200 of an actor (e.g., actor 700).

As with the handover from actor 700 to robotic device 701, the handover from robotic device 701 to actor 700 may be initiated through a combination of visual and audible cues exchanged between robotic device 701 and actor 700. In one example, robotic device 701 may initiate the handover of cup 702 by generating, by way of one or more speakers in robotic head 712 (or in other parts of robotic device 701), an audible utterance asking whether actor 700 would like to receive cup 702 from robotic device 701. Robotic device 701 may additionally reposition robotic arm 708 into a pose gesturing to actor 700 that robotic device 701 is ready to hand cup 702 over to actor 700. Further, robotic head 712 may be reoriented to look at gripper 710 (and cup 702), thereby exhibiting another gesture indicating to actor 700 that robotic device 701 is ready to hand over cup 702. Other visual or audible cues may be possible.

Alternatively or additionally, actor 700 may initiate or confirm handover of cup 702 by uttering a phrase indicating to robotic device 701 that actor 700 would like to receive cup 702 from robotic device 701. Actor 700 may also assume a physical pose indicating an intent to receive cup 702 from robotic device 701 (e.g., holding or moving hand 1200 towards cup 702). Robotic device 701 may use the one or more vision sensors in robotic head 712 to detect actor 700 and fit a virtual skeleton to the pose assumed by actor 700. When the pose represented by the virtual skeleton matches a predetermined configuration or fits into a predetermined range of configurations, robotic device 701 may determine to initiate handover of cup 702 from gripper 710 to actor 700.

In response to robotic device 701 determining to initiate or proceed with object handover, robotic device 701 may enter and operate in a give-object mode. In the give-object mode, robotic device 701 may receive image and/or depth data from the sensors disposed within the palm of gripper 710. As shown in FIG. 12A, the depth sensor and the image sensor (e.g., IR camera) may each have a field of view delineated by lines 1202. The field of view of the depth sensor may be the same as or different from the field of view of the image sensor. A first portion of the fields of view may be obstructed by cup 702, as indicated by lines 1204. A second portion below the first portion (i.e., between line 1202 and line 1204) may remain unobstructed, allowing hand 1200 to be detected therein by the depth or image sensor during the handover.

When the second portion of the field of view is vacant, robotic device 701 may proceed to move arm 708 towards hand 1200. The specific trajectory followed by arm 708 may be determined based on data from the one or more vision sensors in robotic head 712 indicating a relative position between hand 1200 and gripper 710. As with handover of cup 702 from actor 700 to robotic device 701, the speed with which arm 708 advances towards hand 1200 may depend on the distance therebetween. Similarly, arm 708 may be moved to follow hand 1200 when a displacement, a speed, or an acceleration of hand 1200 is under a respective threshold, thus allowing actor 700 to indicate whether handover should continue or be stopped. Actor 700 may hold hand 1200 in a fixed position, allowing arm 708 to bring cup 702 to hand 1200. Alternatively or additionally, actor 700 may reposition hand 1200 towards gripper 710 to coordinate the handover with robotic device 701. In some embodiments, gripper 710 may remain in a fixed position, thereby tasking actor 700 with moving hand 1200 underneath gripper 710 to perform the handover.

When hand 1200 is detected within the second unobstructed portion of the field of view (e.g., the bottom region between lines 1202 and 1204), as illustrated in FIG. 12B, movement of arm 708 may be stopped. Gripper 710 may subsequently be opened, as indicated by lines 1206 in FIG. 12C, to release cup 702 into hand 1200. Detecting hand 1200 in the second portion of the field of view may involve detecting hand 1200 in an area of an image corresponding to the field of view, determining that a distance between the palm of gripper 710 and hand 1200 is smaller than a distance between the palm of gripper 710 and cup 702 (i.e., determining that hand 1200 in under cup 702), or a combination thereof. Notably, by relying on detecting hand 1200 within the second portion of the field of view, robotic device 701 inherently determines that hand 1200 is within a threshold vertical distance of cup 702, since moving hand 1200 down would remove it from within the second portion of the field of view.

In some implementations, gripper 710 may be opened to release cup 702 in response to hand 1200 being disposed underneath cup 702 for at least a threshold period of time. That is, detection of hand 1200 underneath cup 702 may cause arm 708 to stop moving, but gripper 710 might not be opened until hand 1200 remains underneath cup 702 for at least the threshold period of time. Stopping arm 708 once hand 1200 and cup 702 are aligned may facilitate handover and make robotic device 701 safer by preventing movement of arm 708 when hand 1200 (or another object) is underneath gripper 710. Robotic device 701 may be configured to measure an amount of time for which hand 1200 is disposed underneath cup 702. When this amount of time exceeds a threshold time period (e.g., 1 second), gripper 710 may be opened to release cup 702 into hand 1200. This may help prevent gripper 710 from dropping cup 702 when hand 1200 or another object passes under cup 702 for a brief period of time but does not stop there to receive cup 702.

FIGS. 13A, 13B, 13C, and 13D illustrate images 1300, 1302, 1304, and 1306, respectively, that may be captured by the image sensor within the palm of gripper 710 and used to detect whether hand 1200 is disposed underneath cup 702.

Images 1300-1306 are grayscale images captured by an infrared camera (e.g., infrared microcamera 530). Each of images 1300-1306 includes (i) first area 1308 containing the object (e.g., cup 702) held between the two or more fingers of gripper 710 and corresponding to the portion of the field of view between lines 1204 in FIGS. 12A and 12B, (ii) second area 1310 below the object and corresponding to the bottom portion of the field of view between lines 1202 and 1204 in FIGS. 12A and 12B, and (iii) third area 1312 above the object and corresponding to the top portion of the field of view between lines 1202 and 1204 in FIGS. 12A and 12B.

Each of areas 1308, 1310, and 1312 may be dynamically resizable based on the size of the object held by gripper 710. Similarly, the shape of each area may be modifiable based on the shape of the object held by gripper 710, or the shape of gripper 710, among other possibilities.

Images 1300 and 1302 are baseline images that do not represent therein hand 1200. Images 1300 show an object held by gripper 710, as indicated by area 1308 being generally black, and a vacant region underneath the object, as indicated by area 1310 having therein while portions. Area 1312 in image 1300 is shown as vacant, while area 1312 in image 1302 includes therein an object, which may be portion of a tall object held by gripper 710 or another object obstructing that portion of the field of view. For this reason, area 1308 in image 1302 is larger than area 1308 in image 1300 and area 1312 in image 1302 is correspondingly smaller.

Image 1300 or 1302 may be captured by robotic device 701 before hand 1200 is detected (e.g., before advancing arm 708 towards actor 700 or before entering the give-object mode). Image 1300 or 1302 may provide a baseline or reference point against which subsequent images may be compared to detect therein hand 1200.

Images 1304 and 1306 represent therein hand 1200. Specifically, hand 1200 is represented in area 1310 of each of images 1304 and 1306 as a gray region having a pattern roughly approximating a shape of hand 1200 when viewed from the perspective of the image sensor within the palm. Each of images 1304 and 1306 additionally represents cup 702 in area 1308 and vacant space above gripper 710 in area 1312.

The image capture device in the palm of gripper 710 may be an infrared camera that includes an infrared illumination source (e.g., infrared illumination source 532). Thus, objects closer to the palm of gripper 710 may be illuminated and represented with a higher intensity (i.e., black, as shown in FIGS. 13A, 13B, 13C, and 13D) while objects further away may be illuminated and represented with a lower intensity (i.e., white, as shown in FIGS. 13A, 13B, 13C, and 13D). Alternatively, low and high intensity may also be represented in images 1300-1306 by an inverse color scheme (e.g., black for low intensity and white for high intensity).

Hand 1200 may be detected in area 1310 by robotic device 701 in a number of different ways. In one example, hand 1200 may be detected in area 1310 of image 1304 or 1306 by comparing an intensity of at least a portion of the pixels in area 1310 to a threshold intensity value. The threshold intensity value may be a predetermined value or it may be dynamically determined based on, for example, images 1300 and 1302 to account for changing light conditions. Alternatively or additionally, the threshold intensity value may be determined based on the intensity of at least a portion of the pixels in area 1312 which is expected to be vacant. Since areas 1310 and 1312 are each initially expected to be vacant, hand 1200 may be detected in area 1310 when the intensity of at least a portion of the pixels therein diverges from the intensity of at least a portion of the pixels in area 1312 (which is expected to remain vacant). The comparison may involve, for example, a pixel-by-pixel comparison or a comparison of the sums of intensities of the pixels within the different areas.

Additionally, in some implementations, robotic device 701 may also detect hand 1200 underneath cup 702 by determining that the shape of the grayscale pixel pattern in area 1310 matches at least one of a predetermined number of patterns corresponding to a hand. Further, in some implementations, the task or recognizing hand 1200 in image 1304 or 1306 may be performed by one or more machine learning algorithms. For example, hand 1200 may be detected by an artificial neural network trained to detect hands using images captured from the perspective of the palm of gripper 710.

In some cases, the object held in gripper 710 may be large enough to cover up the entire field of view between lines 1202 of the image or depth sensor. For example, cup 702 may be wider and/or taller, thus taking up the entirety of images 1304 and 1306, making image and depth data from sensors in the palm unusable for detection of hand 1200.

In order to determine whether data from the image or depth sensor is usable to detect hand 1200 underneath the object, robotic device 701 may determine whether the object exceeds a threshold size. To that end, robotic device 701 may rely on known information about the object held in gripper 710 (e.g., classification of the object), data from the depth sensor, data from the image sensor, data from vision sensors within robotic head 712, or combinations thereof. For example, the data from the depth sensor may be used to determine that depth is approximately uniform across the entire depth frame, indicating that a single object takes up the depth frame. Additionally or alternatively, the data from the image sensor may be used to determine that the size of area 1310 is smaller than a threshold value (and area 1308 is larger by a corresponding amount) due to the object occluding a larger portion of the field of view of the image sensor.

When robotic device 701 determines that the object held by gripper 710 is under a threshold size, robotic device 701 may use image and depth data from sensors in the palm of gripper 710 to detect hand 1200, as described above. When robotic device 701 determines that the object held by the gripper is larger than the threshold size and thus occludes the entire field of view of the sensors in the palm of gripper 710, robotic device 701 may instead rely on data from vision sensors in robotic head 712 to perform the handover to hand 1200. That is, based on image data from vision sensors in robotic head 712, arm 708 may be caused to advance towards hand 1200 when the distance between hand 1200 and gripper 710 exceeds a threshold distance, and arm 708 may be cause to stop and open the fingers of gripper 710 when gripper 710 comes within the threshold distance (e.g., when gripper 710 is positioned above hand 1200).

Notably, using the sensors in the palm of gripper 710 may allow for a more accurate handover due to these sensors having a more direct view of hand 1200 disposed beneath gripper 710. Although FIGS. 12A-13D illustrate the area underneath gripper 710 being monitored for hand 1200, other implementations may similarly monitor the area on top of the gripper or on the sides of the gripper for hand 1200. For example, a robotic device utilizing a gripper with vertically-opposable digits (rather than the horizontally-opposable digits of gripper 710) may monitor the sides of the gripper for hand 1200. The portion of the field of view monitored for hand 1200 may depend of the type of gripper used by the robotic device or the type of object being handed over, among other possibilities.

IX. Further Example Operations

Figure 14:
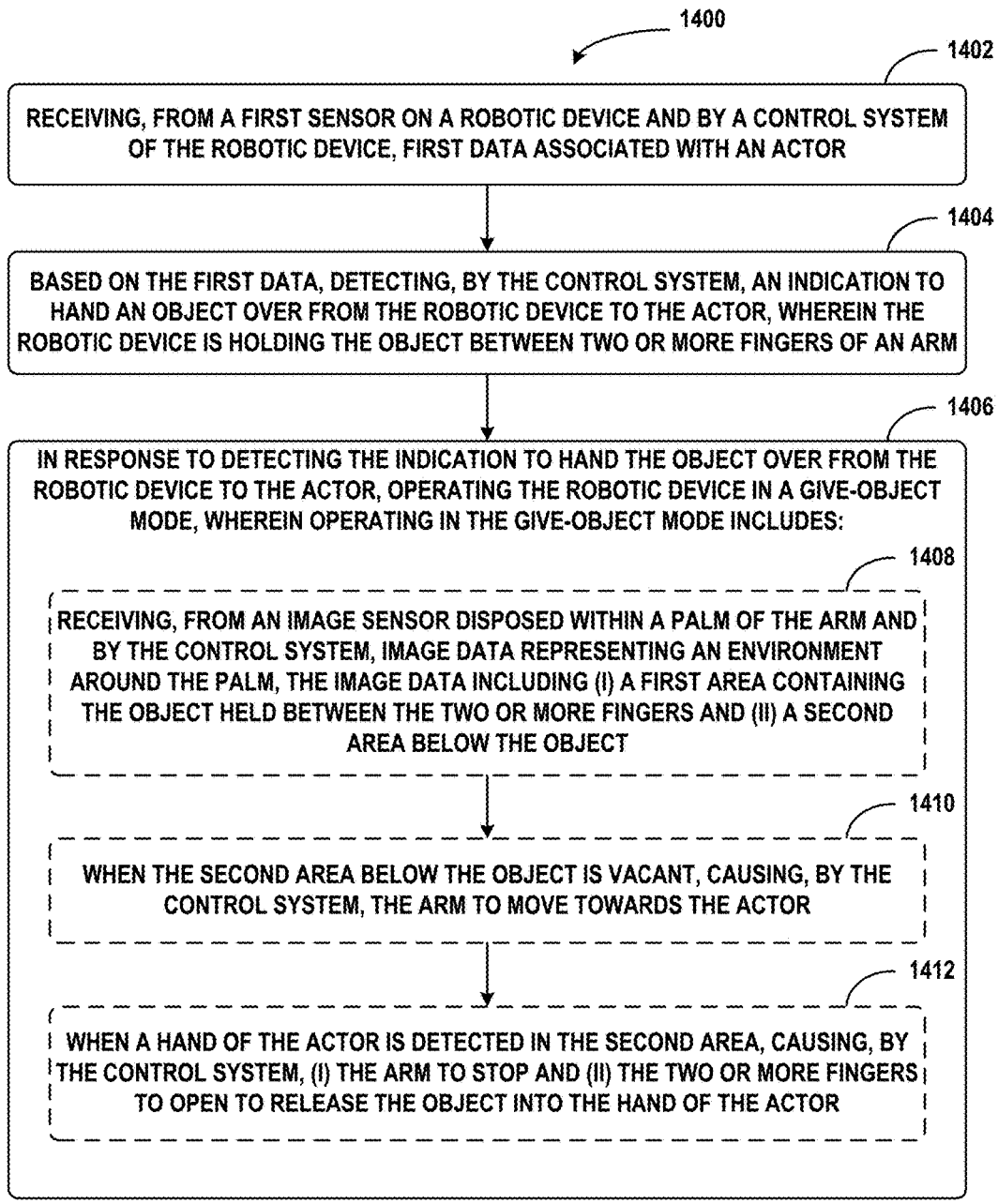
FIG. 14 illustrates a flow chart, in accordance with example embodiments.

FIG. 14 illustrates flow chart 1400 of operations related to a robotic device giving an object to an actor. The operations may be carried out by robotic system 100, robotic arm 200, robotic device 701, control systems thereof, or other computing devices associated therewith. The operations may be similar to and may include variations of the operations discussed with respect to FIGS. 12A-13D.

Block 1402 may involve receiving, from a first sensor on a robotic device and by a control system of the robotic device, first data associated with an actor.

Block 1404 may involve, based on the first data, detecting, by the control system, an indication to hand an object over from the robotic device to the actor. The robotic device may be holding the object between two or more fingers of an arm.

Block 1406 may involve, in response to detecting the indication to hand the object over from the robotic device to the actor, operating the robotic device in a give-object mode. Operating in the give-object mode may include performing the operations of blocks 1408, 1410, and 1412.

Block 1408 may involve receiving, from an image sensor disposed within a palm of the arm and by the control system, image data representing an environment around the palm. The image data may include (i) a first area containing the object held between the two or more fingers and (ii) a second area below the object.

Block 1410 may involve, when the second area below the object is vacant, causing, by the control system, the arm to move towards the actor.

Block 1412 may involve, when a hand of the actor is detected in the second area, causing, by the control system, (i) the arm to stop and (ii) the two or more fingers to open to release the object into the hand of the actor.

In some embodiments, operating in the give-object mode may also involve causing the two or more fingers to open to release the object into the hand of the actor in response to the hand of the actor being detected in the second area for at least a threshold period of time.

In some embodiments, operating in the give-object mode may also involve detecting the hand in the second area by comparing an intensity of at least a portion of pixels in the second area to a threshold intensity.

In some embodiments, operating in the give-object mode may also involve determining a baseline intensity of pixels in the second area and detecting the hand in the second area by comparing an intensity of at least a portion of pixels in the second area to the baseline intensity.

In some embodiments, the image data may include a third area above the object that is expected to be vacant. Operating in the give-object mode may also involve detecting the hand in the second area by comparing an intensity of at least a portion of pixels in the second area to an intensity of at least a portion of pixels in the third area.

In some embodiments, the first sensor may be a first image sensor. The image sensor disposed within the palm may be a second image sensor. Operating in the give-object mode may also involve determining that the second area is smaller than a threshold value due to the object occluding a field of view of the second image sensor. In response to determining that the second area is smaller than the threshold value, (i) the arm may be caused to move towards the actor, (ii) the arm may be caused to stop and (iii) the two or more fingers may be caused to open to release the object into the hand of the actor based on second image data received from the first image sensor and representing the environment around the palm from a first perspective different from a second perspective of the second image sensor.

In some embodiments, the robotic device may also include a depth sensor disposed within the palm. Operating in the give-object mode may also involve receiving, from the depth sensor, depth data representing (i) a first distance between the palm and physical features within the first area and (ii) a second distance between the palm and physical features in the second area. The arm may be caused to move towards the actor when (i) the second area below the object is vacant and (ii) the second distance is greater than the first distance. The arm may be caused to stop and the two or more fingers may be caused to open to release the object into the hand of the actor when the hand of the actor is detected in the second area and the second distance is smaller than the first distance.

X. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A robotic device comprising:
    an arm comprising a palm and two or more fingers;
    a first sensor;
    a depth sensor disposed within the palm; and
    a control system configured to:
        receive, from the first sensor, first data associated with an actor holding an object;
        detect an indication to receive the object from the actor based on the first data; and
        in response to detecting the indication to receive the object from the actor, cause the robotic device to enter a receive-object mode, wherein, when the robotic device is in the receive-object mode, the control system is further configured to:
            receive, from the depth sensor, depth data indicating a distance between the palm and the object;
            when the distance between the palm and the object is greater than a first threshold and less than a second threshold, cause the arm to move towards the object;
            when the distance between the palm and the object exceeds the second threshold, maintain the arm in a fixed position; and
            when the distance between the palm and the object drops below the first threshold, cause the two or more fingers to close to grasp the object.

2. The robotic device of claim 1, wherein, when the robotic device is in the receive-object mode, the control system is further configured to:
    move the arm into a first position to wait for hand-over of the object from the actor.

3. The robotic device of claim 2, wherein the control system is further configured to move the arm into the first position by:
    moving the arm away from the object to a distance outside of the second threshold to gesture that the robotic device is in the receive-object mode and is ready to receive the object from the actor.

4. The robotic device of claim 2, wherein the control system is further configured to move the arm into the first position by:
    moving the arm along a predetermined trajectory to gesture that the robotic device is in the receive-object mode and is ready to receive the object from the actor.

5. The robotic device of claim 1, wherein, when the robotic device is in the receive-object mode, the control system is further configured to:
    determine the distance between the palm and the object based on a perpendicular component of a distance represented by the depth data, wherein the first threshold and the second threshold each represent respective distances along an axis perpendicular to the palm.

6. The robotic device of claim 1, wherein the robotic device further comprises an image sensor, and wherein, when the robotic device is in the receive-object mode, the control system is further configured to:
    receive, from the image sensor, image data indicating a position of the object relative to the palm; and
    based on the image data, adjust a lateral position of the arm to place the object within a field of view of the depth sensor.

7. The robotic device of claim 1, wherein the first sensor comprises an image sensor, wherein the first data is image data, and wherein the control system is configured to detect the indication to receive the object from the actor by:
    identifying, based on the image data, (i) the object and (ii) a virtual skeleton representing the actor; and
    detecting the indication to receive the object from the actor based on a pose of the virtual skeleton and a position of the object relative to the virtual skeleton reaching a predetermined configuration.

8. The robotic device of claim 1, wherein the first sensor comprises a microphone communicatively connected to the control system, and wherein the control system is configured to detect the indication to receive the object from the actor by:
    detecting, by way of the microphone, an utterance by the actor; and
    determining that the utterance indicates to receive the object from the actor.

9. The robotic device of claim 1, wherein the first sensor is an image sensor, wherein the first data is image data, wherein the robotic device further comprises an audio speaker and a microphone, and wherein the control system is configured to detect the indication to receive the object from the actor by:
    identifying, based on the image data, (i) the object and (ii) a virtual skeleton representing the actor;
    in response to a pose of the virtual skeleton and a position of the object relative to the virtual skeleton reaching a predetermined configuration, causing the audio speaker to generate an utterance requesting hand-over of the object from the actor to the arm; and
    detecting, by way of the microphone, an utterance by the actor indicating to receive the object from the actor.

10. The robotic device of claim 1, wherein, when the robotic device is in the receive-object mode, the control system is further configured to:
    cause the two or more fingers to open to expose the depth sensor disposed within the palm before receiving the depth data.

11. The robotic device of claim 1, wherein the first sensor comprises an image sensor, and wherein, when the robotic device is in the receive-object mode, the control system is further configured to:
    receive, from the image sensor, image data representing the actor holding the object; and based on the image data, verify that the depth data received from the depth sensor indicates the distance between the palm and the object.

12. The robotic device of claim 1, further comprising an image sensor disposed within the palm, wherein, when the robotic device is in the receive-object mode, the control system is further configured to:
receive, from the image sensor, image data representing the actor holding the object; and
based on the image data, verify that the depth data received from the depth sensor indicates the distance between the palm and the object.

13. The robotic device of claim 1, wherein, when the robotic device is in the receive-object mode, the control system is further configured to:
determine a speed with which to move the arm towards the object based on the distance between the palm and the object.

14. The robotic device of claim 1, wherein the depth sensor disposed within the palm comprises a first time-of-flight sensor having a first range and a second time-of-flight sensor having a second range greater than the first range, and wherein the control system is further configured to receive the depth data by:
receiving first depth data from the first time-of-flight sensor and second depth data from the second time-of-flight sensor; and
determining the distance between the palm and the object based on at least one of the first depth data and the second depth data.

15. A method comprising:
receiving, from a first sensor on a robotic device and by a control system of the robotic device, first data associated with an actor holding an object;
based on the first data, detecting, by the control system, an indication to receive the object from the actor by an arm of the robotic device, wherein the arm comprises a palm and two or more fingers; and
in response to detecting the indication to receive the object from the actor, operating the robotic device in a receive-object mode, wherein operating in the receive-object mode comprises:
receiving, from a depth sensor disposed within the palm and by the control system, depth data indicating a distance between the palm and the object;
when the distance between the palm and the object is greater than a first threshold and less than a second threshold, causing, by the control system, the arm to move towards the object;
when the distance between the palm and the object exceeds the second threshold, causing, by the control system, the arm to be maintained in a fixed position; and
when the distance between the palm and the object drops below the first threshold, causing, by the control system, the two or more fingers to close to grasp the object.

16. The method of claim 15, wherein operating in the receive-object mode further comprises:
moving the arm into a first position to wait for hand-over of the object from the actor.

17. The method of claim 16, wherein moving the arm into the first position comprises:
moving the arm away from the object to a distance outside of the second threshold to gesture that the robotic device is in the receive-object mode and is ready to receive the object from the actor.

18. The method of claim 15, wherein operating in the receive-object mode further comprises:
determining the distance between the palm and the object based on a perpendicular component of a distance represented by the depth data, wherein the first threshold and the second threshold each represent respective distances along an axis perpendicular to the palm.

19. The method of claim 15, wherein operating in the receive-object mode further comprises:
receiving, from an image sensor on the robotic device, image data indicating a position of the object relative to the palm; and
based on the image data, adjusting a lateral position of the arm to place the object within a field of view of the depth sensor.

20. A non-transitory computer readable medium having stored thereon instructions that, when executed by a computing device, cause the computing device to perform operations comprising:
receiving, from a first sensor on a robotic device, first data associated with an actor holding an object;
based on the first data, detecting an indication to receive the object from the actor by an arm of the robotic device, wherein the arm comprises a palm and two or more fingers; and
in response to detecting the indication to receive the object from the actor, operating the robotic device in a receive-object mode, wherein operating in the receive-object mode comprises:
receiving, from a depth sensor disposed within the palm, depth data indicating a distance between the palm and the object;
when the distance between the palm and the object is greater than a first threshold and less than a second threshold, causing the arm to move towards the object;
when the distance between the palm and the object exceeds the second threshold, causing the arm to be maintained in a fixed position; and
when the distance between the palm and the object drops below the first threshold, causing the two or more fingers to close to grasp the object.

\* \* \* \* \*